(12) United States Patent
Iida et al.

(10) Patent No.: US 7,070,352 B2
(45) Date of Patent: Jul. 4, 2006

(54) WRITING IMPLEMENT

(75) Inventors: Hisashi Iida, Yokohama (JP); Shigeru Okumura, Yokohama (JP); Kazuaki Matsumoto, Yokohama (JP); Seiichi Kobayashi, Yokohama (JP); Takeshi Kobayashi, Yokohama (JP); Yusuke Kobayashi, Yokohama (JP); Yosuke Mito, Tokyo (JP)

(73) Assignee: Mitsubishi Pencil Kabushikikaisha, Tokyo (JP)

( * ) Notice: Subject to any disclaimer, the term of this patent is extended or adjusted under 35 U.S.C. 154(b) by 115 days.

(21) Appl. No.: 10/488,049

(22) PCT Filed: Aug. 30, 2002

(86) PCT No.: PCT/JP02/08788

§ 371 (c)(1),
(2), (4) Date: Feb. 27, 2004

(87) PCT Pub. No.: WO03/018329

PCT Pub. Date: Jun. 3, 2003

(65) Prior Publication Data

US 2004/0240925 A1  Dec. 2, 2004

(30) Foreign Application Priority Data

| Aug. 31, 2001 | (JP) | ............................... 2001-263558 |
| Sep. 20, 2001 | (JP) | ............................... 2001-286118 |
| Sep. 21, 2001 | (JP) | ............................... 2001-2900002 |
| Sep. 25, 2001 | (JP) | ............................... 2001-291422 |
| Sep. 26, 2001 | (JP) | ............................... 2001-293592 |
| Sep. 27, 2001 | (JP) | ............................... 2001-295612 |

(51) Int. Cl.
*B43K 5/02* (2006.01)
*B43K 5/12* (2006.01)
*B43K 5/00* (2006.01)

(52) U.S. Cl. ...................... 401/41; 401/40; 401/198; 401/192

(58) Field of Classification Search .................. 401/40, 401/41, 42, 43, 17, 21, 23, 192, 223, 224, 401/225
See application file for complete search history.

(56) References Cited

U.S. PATENT DOCUMENTS

| 1,346,184 | A | * | 7/1920 | Dickinson | .................... 401/187 |
| 1,978,676 | A | | 10/1934 | Kingman | ...................... 120/42 |
| 1,998,930 | A | | 4/1935 | Kingman | ...................... 120/42 |
| 2,061,405 | A | * | 11/1936 | Kingman | ...................... 401/40 |
| 2,581,739 | A | * | 1/1952 | Wing | ......................... 401/225 |

(Continued)

FOREIGN PATENT DOCUMENTS

JP        14-14173 Y1      9/1939

(Continued)

*Primary Examiner*—David J. Walczak
(74) *Attorney, Agent, or Firm*—Kubovcik & Kubovcik

(57) ABSTRACT

A writing implement includes a cylindrical shaft member, a pen tip member which is fixed to one end of the shaft member and from which colored ink seeps out, liquid for ink which is stored in the shaft member and which comprises a major component of the colored ink seeping out from an end of the pen tip member, colorant to be added to the liquid for ink, and a valve member for isolating the colorant from the liquid for ink. In the writing implement, at least a part of a cylindrical side surface of the shaft member corresponding to a part where the liquid for ink is stored is formed to be transparent, the valve member is positioned between the storing part of the liquid for ink and the colorant, and the storing part of the liquid for ink is provided with a pressure-regulating part.

13 Claims, 19 Drawing Sheets

U.S. PATENT DOCUMENTS

| | | | | |
|---|---|---|---|---|
| 3,720,473 A | * | 3/1973 | Nakata | 401/40 |
| 3,993,409 A | | 11/1976 | Hart | 401/199 |
| 5,433,545 A | | 7/1995 | Keil | 401/40 |
| 6,244,774 B1 | | 6/2001 | Barosso et al. | 401/198 |

FOREIGN PATENT DOCUMENTS

| | | |
|---|---|---|
| JP | 15-7603 Y1 | 6/1940 |
| WO | 01/70515 A1 | 9/2001 |

* cited by examiner

C ; colorant  V ;valve member  R ; restriction member closed open closed open or closed open or closed Fig. 19
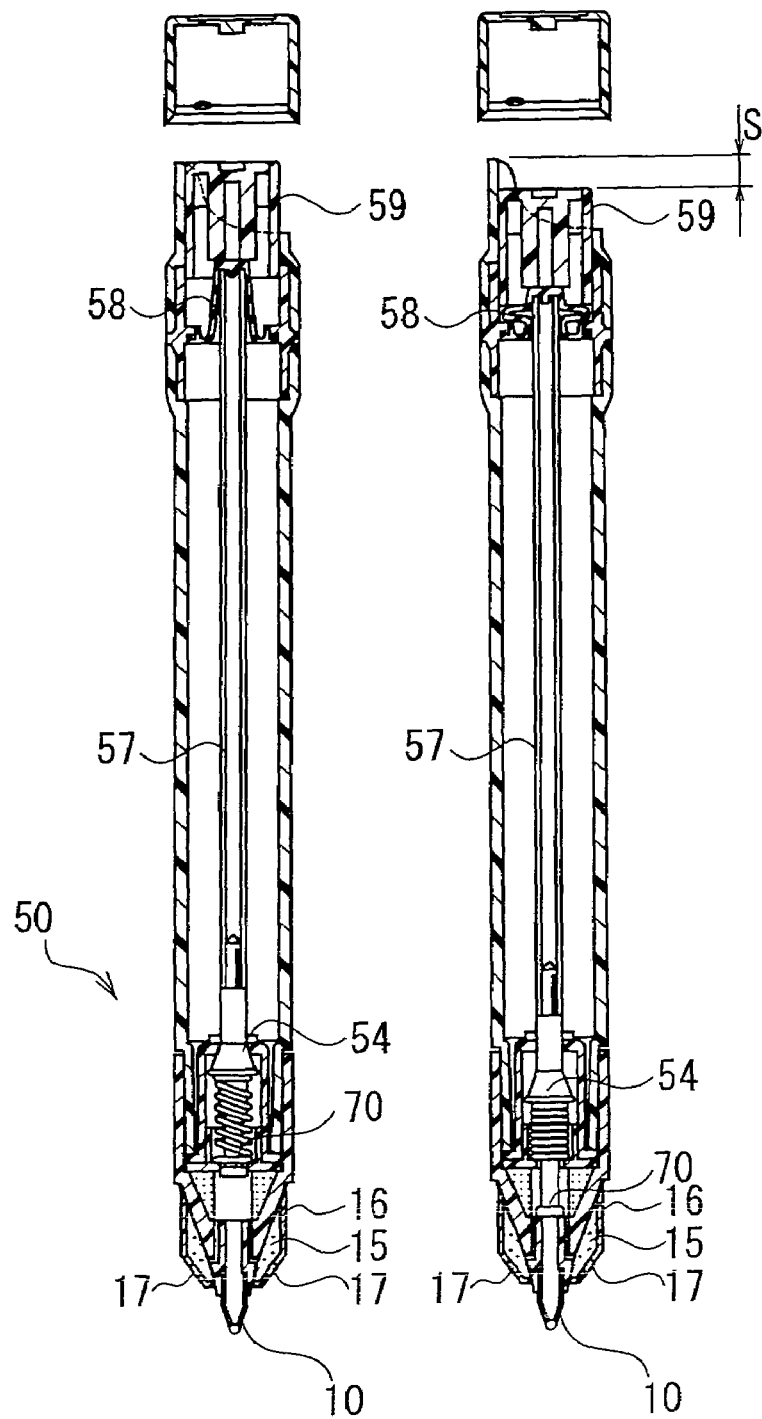
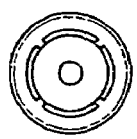
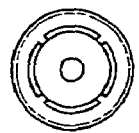

WRITING IMPLEMENT

TECHNICAL FIELD

The present invention belongs to a field related to manufacture of a writing implement which uses ink. The writing implement stores liquid for ink and colorant separately therein, both of which are to be included in the ink, whereby the colorant is added to the liquid for ink in process of introducing the liquid for ink to a tip member of the pen in order to produce colored ink, thereby allowing for writing in the colored ink.

BACKGROUND ART (Prior Art)

A writing implement, which stores colored ink therein and introduces the ink to a tip of the writing implement in order to write down, specifically includes a fountain pen, a ballpoint pen, a felt pen, a sign pen (a marking pen), or a needle pen, for example. In the case of the ink which is used for such a writing implement, dye or pigment is dissolved or dispersed in vehicle matter (solvent or medium) substantially uniformly in advance, and the ink is so prepared that its color shown when contained in the writing implement is almost the same as that shown when transferred to a writing surface.

The present applicant has discovered Japanese Utility Model Publication No. 15-7603 as a technique related to the present invention.

The document discloses a solid-ink fountain pen, and its FIG. 1 shows a mechanism of allowing for advance and retreat of a water-stopper by turning a member such as a member. However, the figure is so incomplete that it is presumed that the advance and retreat is impossible. Even if the advance and retreat is possible, the advance and retreat of the arrow-headed water-stopper cannot prevent water infiltration resulting in ink leakage and has little practicality. Moreover, since the fountain pen described in the document stores solid ink which is to be mixed with water being separately stored, it is not a writing implement having a specific appearance.

(Object of the Invention)

An object of the present invention is to provide a writing implement having a specific appearance. That is, an object of the present invention is to provide a writing implement having a specificity of inconsistency between an appearance thereof and a feeling of use thereof that the color and thickness of liquid stored in a shaft member thereof is different from that of a written line.

DISCLOSURE OF THE INVENTION (Basic Constitution)

To achieve an object of the present invention, following constitutions are required.

First, such a structure is necessary that transparent liquid for ink and colorant for coloring the liquid for ink are separately stored in the writing implement, and that the transparent liquid for ink is visible.

Second, such a structure is necessary that the transparent liquid for ink and the colorant for coloring the liquid for ink can be mixed to be supplied to a pen tip when writing.

Third, such a structure is necessary that the colored ink having been colored by the colorant may not mix into a storing part of the transparent liquid for ink when not writing.

(Constitution 1)

Constitution 1 relates to a writing implement in which liquid for ink and colorant are separately stored. That is, it comprises a cylindrical shaft member, a pen tip member which is fixed to one end of the shaft member and from which colored ink seeps out, the liquid for ink which is stored in the shaft member and which comprises a major component of the colored ink seeping out from an end of the pen tip member, the colorant to be added to the liquid for ink to be the colored ink, and a valve member for isolating the colorant from the liquid for ink. In the writing implement, at least a part of a cylindrical side surface of the shaft member corresponding to a part where the liquid for ink is stored is formed to be transparent, the valve member is positioned between the storing part of the liquid for ink and the colorant), and the storing part of the liquid for ink is provided with a pressure-regulating part for preventing an increase or decrease of a pressure in the storing part.

(Terminology for Constitution 1)

The "shaft member" may be a member integrated into the storing container of the liquid for ink to make up the shaft, or may also be a cylindrical hollow member in which a freely detachable ink cartridge is used as the storing container of the liquid for ink, the ink cartridge being stored in the shaft member and interchangeably formed.

The words that "at least a part of a cylindrical side surface of the shaft member corresponding to a part where the liquid for ink is stored is formed to be transparent" means that, though it is general that the part where the liquid for ink is stored is entirely formed to be transparent, a writing implement whose part where the liquid for ink is stored is partially formed to be transparent may be included in the present invention.

The "pressure-regulating part" is means for constantly maintaining a pressure in the storing part according to the air expansion or contraction caused by consumption of the liquid for ink or by the temperature change. It is, for example, general to provide the pressure-regulating part as a communicating hole at a rear end of the shaft member for communicating an inner space of the shaft member with the air outside. When using such an embodiment of the pressure-regulating part, it may often be necessary to prevent the leakage of the liquid from the communicating hole. In such a case, at an end of the liquid for ink opposite to the pen tip member is often provided greasy, pasty or gellous non-drying substance, or a slide plug.

Another embodiment of the pressure-regulating part is, for example, a valve mechanism. Namely, the valve is opened in response to the pressure change in order to communicate the inner space of the shaft member with the air outside, resulting in that the liquid for ink or the air outside can be introduced or discharged.

Moreover, another embodiment of the pressure-regulating part is means using a capillary activity by which the liquid flows into a space with little influence at a positive pressure and by which air flows in at a negative pressure (e.g. a collector).

The embodiment of the pressure-regulating part is not only limited to the above-described ones, but also a combination of some of the above-described ones.

The "valve member" is functionally a check valve for preventing a backward flow of the liquid for ink once been supplied to the colorant. Moreover, a dual valve may also be adopted for the purpose of completely preventing the backward flow. In terms of positioning of each valve when the dual valve is used, the valves can be positioned individually at an end of a restriction member which will be described below for another constitution, for example.

The words that "liquid for ink and colorant are separately stored" means that, inside the writing implement, the liquid for ink and the colorant, both of which are to be included in the ink, are respectively stored in physically different spaces. That is, as described in the terminology related to the shaft member, a freely detachable ink cartridge may be used as a storing container of the liquid for ink for example.

The "liquid for ink" may be vehicle matter included in the conventional ink (which is colorless and transparent liquid that mainly consists of the conventional ink other than its dye or pigment), or may also be colored liquid which is obtained by adding dye or pigment to the vehicle matter. According to the constitution of the present invention, the colorant is added in process of introducing the liquid for ink to the pen tip member. Therefore, in the former case, the colorless and transparent liquid for ink is transferred on a writing surface as a line drawn with colored ink. In the latter case, the color and thickness of the drawn line can be different from those of the liquid for ink.

Concretely, the vehicle matter in the conventional ink can be used for the "liquid for ink" as it is. Thus, the transparent or translucent liquid for ink can be prepared. Moreover, for example, by adding a predetermined component to the vehicle matter of the conventional ink, or by removing a predetermined component from the vehicle matter of the conventional ink, the transparent or translucent liquid for ink can be prepared. Moreover, for example, by dissolving or dispersing dye or pigment in the vehicle matter of the conventional ink, colored and transparent or translucent liquid for ink can also be prepared. In this manner, for example, the liquid for ink whose color has the same hue as the colorant can be prepared. Moreover, for example, the liquid for ink whose color has a different hue from the colorant can also be prepared. The way in which the liquid for ink is prepared depends on the appearance desired.

The vehicle matter as the liquid for ink can be prepared by blending, for example, water, water-soluble organic solvent, lubricant, preservative, anti-corrosive, pH-controlling agent, anti-drying agent, thickener, and emulsion as appropriate.

The "colorant" is for producing colored ink by being added to the above-described liquid for ink.

For example, dye or pigment included in the conventional ink can be used. Thereby, colorant in solid form or in highly-concentrated liquid form can be prepared. Moreover, for example, by dissolving or dispersing an extremely large amount of dye or pigment in the vehicle matter of the conventional ink, the colorant in highly-concentrated liquid form can be prepared. Moreover, for example, by dissolving or dispersing an extremely large amount of dye or pigment in a predetermined component in the vehicle matter of the conventional ink, the colorant in highly-concentrated liquid form can also be prepared. The way in which the colorant is prepared depends on the way in which the colorant is added to the liquid for ink.

Moreover, as the dye for the colorant, for example, direct dye, acid dye, basic dye, fluorescent dye, or food color can be used. Moreover, as the pigment for the colorant, for example, inorganic pigment, organic pigment, inorganic fluorescent pigment, or organic fluorescent pigment can be used. Moreover, a "main component of the colorant" means all of the colorant as well as a substantial portion of the colorant.

Furthermore, detailed explanation will be made below in the embodiments with respect to water, water-soluble organic solvent, lubricant, preservative, anti-corrosive, pH-controlling agent, anti-drying agent, thickener, emulsion, direct dye, acid dye, basic dye, fluorescent dye, food color, inorganic pigment, organic pigment, inorganic fluorescent pigment, and organic fluorescent pigment.

With respect to the shape of the colorant, in case of solid form, a merely small bulky shape, a ring shape, or a lotus shape can be selected as appropriate.

A "pen tip member" means, for example, a nib when the writing implement is a fountain pen, a ball pen tip when the writing implement is a ballpoint pen, a writing tip made of felt when the writing implement is a felt pen, a writing tip made of fiber bundle when the writing implement is a sign pen (a marking pen), or an elongated tubular writing tip when the writing implement is a needle pen. Furthermore, since the writing implement is not limited to those described above, the pen tip member is not limited to those described above as well.

The colorant is added to the liquid for ink in process of introducing the liquid for ink to the pen tip member. Examples of such aspects are as follows. First, in process of introducing the liquid for ink to the pen tip member, the colorant in solid form is added to the liquid for ink with the colorant gradually dispersed therein when the liquid for ink is passing through the storing part of the colorant in solid form. Second, in process of introducing the liquid for ink to the pen tip member, the colorant in liquid form is added to the liquid for ink with the colorant gradually mixed therewith when the liquid for ink is passing through the storing part of the colorant in liquid form. Third, in process of introducing the liquid for ink to the pen tip member, the colorant in liquid form is directly added to the liquid for ink.

(Function of Constitution 1)

Since at least a part of a cylindrical side surface of the shaft member corresponding to a part where the liquid for ink is stored is formed to be transparent, the user of the writing implement according to the present invention can visually recognize the liquid for ink. On the other hand, the colored ink whose color is different from the liquid for ink seeps out of the pen tip member when writing, so that the user can have a unique feeling that the appearance of the implement is not consistent with the feeling of use. For example, the user can draw a blue line despite the visual recognition of the colorless liquid for ink, or the user can draw a black line despite the visual recognition of pale red liquid for ink.

When writing, the valve member is opened and the liquid for ink passes through the valve member, and then the colorant is added to the liquid for ink and the colored ink seeps out of the end of the pen tip member to be written. When not writing, movement of the colorant to the liquid for ink is blocked by closing the valve member. Thereby, the colored ink having been added with the colorant not having been consumed by writing is prevented from flowing backward to the storing part of the liquid for ink by closing the valve member. Consequently, the liquid for ink can stably maintain the color and its thickness for a middle-and-long term.

Although the pressure in the storing part of the liquid for ink may increase and decrease due to an outside temperature or heat transmission in use, leakage of the liquid for ink caused by the increase and decrease thereof can be prevented by using the pressure-regulating part which controls the increase and decrease of the pressure.

(Constitution 2)

Constitution 2 relates to a writing implement referred to as a so-called double-headed pen, in which liquid for ink and colorant are separately stored therein.

That is, this writing implement comprises a cylindrical shaft member, two pen tip members which are fixed to both ends of the shaft member and from which colored ink seeps out, the liquid for ink which is stored in the shaft member and which comprises a major component of the colored ink seeping out from ends of the pen tip members, two colorant to be added to the liquid for ink to be the colored ink, and two valve members for isolating respectively the two colorant from the liquid for ink, wherein at least a part of a cylindrical side surface of the shaft member corresponding to the storing part of the liquid for ink is formed to be transparent, each of the two valve members is positioned between the storing part of the liquid for ink and each of the colorant, and the storing part of the liquid for ink is provided with a pressure-regulating part for preventing the increase and decrease of the pressure in the storing part.

When two pen tip members are fixed at both ends of the shaft member, respectively, two storing parts of the liquid for ink may be provided independently for each of the two pen tip members or one storing part may be shared by the two pen tip members. The latter is more preferable because the liquid for ink can be effectively consumed to the end. In the former case, on the other hand, it is likely that one of the two pen tips becomes unable to write sooner than another.

(Function of Constitution 2)

Since at least a part of a cylindrical side surface of the shaft member corresponding to a part where the liquid for ink is stored is formed to be transparent, the user of the writing implement according to the present invention can visually recognize the liquid for ink. On the other hand, the colored ink whose color is different from the liquid for ink seeps out of the pen tip member when writing, so that the user can have a unique feeling that the appearance of the implement is not consistent with the feeling of use.

When writing with either of the pen tip members, the valve member is opened and the liquid for ink passes through the valve member, and then the colorant is added to the liquid for ink and the colored ink seeps out of the end of the pen tip member to be written. When not writing, movement of the colorant to the liquid for ink is blocked by closing the valve member. Thereby, the colored ink having been added with the colorant not having been consumed by writing is prevented from flowing backward to the storing part of the liquid for ink by closing the valve member. Consequently, the liquid for ink can stably maintain the color and its thickness for a middle-and-long term.

Although the pressure in the storing part of the liquid for ink may increase and decrease due to an outside temperature or heat transmission in use, leakage of the liquid for ink caused by the increase and decrease thereof can be prevented by using the pressure-regulating part which controls the increase and decrease of the pressure.

(Constitution 3)

Constitution 3 is a limited constitution of the writing implement described in either Constitution 1 or 2, and relates to the writing implement wherein a valve member cooperates with a pen tip member such that the valve member is opened when writing and is closed when not writing.

An example of the valve member is a structure which, where the pen tip member comprises a mechanism slightly advancing and retreating according to writing, opens and closes according to the advance and retreat of the mechanism.

(Function of Constitution 3)

Since the valve member is opened when writing, the liquid for ink moves to the colorant and the colorant is added to the liquid for ink, so that writing with the colored ink seeping out from the end of the pen tip member is not disturbed. On the other hand, since the valve member closes when not writing, the liquid for ink having once been sent to the colorant is prevented from flowing backward. Consequently, the liquid for ink can stably maintain the color and its thickness for a middle-and-long term.

(Constitution 4)

Constitution 4 is a limited constitution of the writing implement described in any one of Constitutions 1 to 3, and relates to the writing implement which has a valve-operating mechanism that can be operated to open and close the valve member.

The valve-operating mechanism is a mechanism which can open and close the valve member through the operation by a user of the writing implement, and includes an advance and retreat type of push-action mechanism provided at an end of a shaft member opposite to a pen tip member or a pressure type of push-action mechanism provided near the middle of the shaft member. More specifically, the mechanism is biased by a spring such that the advancing and retreating motion can be achieved along the axial direction without requiring a turning operation.

According to Constitution 4 which is a limited constitution of Constitution 3, it is also possible to open and close the valve by the user's operation, while providing a structure for opening the valve when writing and closing the valve when not writing.

(Function of Constitution 4)

If it is desired to increase an outflow of the colored ink which seeps out from the end of the pen tip member, the user of this writing implement manipulates the valve-operating mechanism to open the valve member. If it is desired to decrease the outflow of the colored ink or to complete writing, the user of this writing implement manipulates the valve-operating mechanism to close the valve member.

(Constitution 5)

Constitution 5 is a limited constitution of the writing implement described in any one of Constitutions 1 to 4, and relates to the writing implement which has colorant-adsorbing material in the storing part of liquid for ink in order to adsorb the colorant from the colored ink which has been added with the colorant and penetrates into the storing part.

The "colorant-adsorbing material" includes, for example, a substance having a capillary activity (such as a substance processed by bundling fibers, a substance having a capillary activity in an internal of a resin mold, a substance having a capillary activity outside a resin mold, or the like), activated carbon, zeolite, silica gel, alumina, and high polymer. The material is not limited to a specific shape, such as fragmental, particulate, or fibrous shape.

(Function of Constitution 5)

When the colored ink having been added with the colorant is penetrated into the storing part of the liquid for ink on the side of the pen tip member, the colorant-adsorbing material adsorbs the colorant. Consequently, a color or thickness is stably maintained in the storing part of the liquid for ink for a middle-and-long term.

(Constitution 6)

Constitution 6 is a limited constitution of the writing implement described in any one of Constitutions 1 to 5, and relates to the writing implement which has a restriction member between the valve member and the storing part of the liquid for ink in order to prevent the colorant from moving toward the liquid for ink.

(Terminology for Constitution 6)

There are two types with respect to the "restriction member," one of which is an adsorbing member having an adsorbent as a main component, and the other a filtering member that can be permeated by liquid and cannot be permeated by particles. It is also possible to provide the restriction member divided between the storing part of the liquid for ink and the storing part of the colorant. In the case where it is divided, it is also possible to combine material of different capillary activity.

As the adsorbing member, it is possible to use carbonaceous material referred to as activated carbon described above such as wood, coal and coconut shell, activated synthetic resin such as Saran and polyvinylidene chloride, activated carbon fibers obtained by activating polyacrylonitrile fibers, cellulose and coal tar pitch as well as bone ash, zeolite, silica gel, alumina and high polymers.

As the filtering member, there is semi-permeable membrane, for example. Semi-permeable membrane has a great number of pores whose diameters are about 10 to 1000 angstroms and, therefore, the majority of components constituting the liquid for ink can flow through these pores, but the dye or pigment constituting the colorant cannot flow through these pores. Therefore, the movement of the liquid for ink toward the colorant is not inhibited, while the movement of the colorant toward the liquid for ink is restricted.

Exemplary semi-permeable membrane is fabricated by using, for example, cellophane, polyvinylalcohol membrane, bladder membrane, collodion membrane, cell membrane, cellulose acetate membrane, hollow fiber membrane, membrane filter, column for liquid chromatography (ion exchange resin), or moisture permeable waterproof material (e.g., GORE-TEX (trade name)).

As the restriction member, it is also possible to use substance having a capillary activity such as one processed by bundling fibers, one having a capillary activity in an internal of a resin mold, or one having a capillary-activity outside a resin mold.

(Function of Constitution 6)

Even when the colored ink having been added with the colorant seeps out into the storing part of the liquid for ink at a time of opening the valve member, the restriction member prevents the colorant from moving toward the liquid for ink. Consequently, a color or thickness is stably maintained in the storing part of the liquid for ink for a middle-and-long term.

(Constitution 7)

Constitution 7 is a limited constitution of the writing implement described in any one of Constitutions 1 to 6, and relates to the writing implement which has a restriction member between the valve member and the colorant in order to prevent colored ink added with the colorant from diffusing.

Even when the colored ink added with the colorant seeps out toward the valve member, the restriction member prevents the colored ink from flowing backward to the storing part of the liquid for ink at a time of opening the valve member. Consequently, a color or thickness is stably maintained in the storing part of the liquid for ink for a middle-and-long term.

(Constitution 8)

Constitution 8 is a limited constitution of the writing implement described in any one of Constitutions 1 to 7, wherein insoluble substance whose specific gravity is approximately the same as that of the liquid for ink is dispersed in the storing part of the liquid for ink.

"Insoluble substance" herein is solid matter which does not dissolve in the liquid for ink such as minute thin sheets made of thermoplastic resins. The substance can also be made of thin metal film, a small metal object, metal powder, or a small glass object, for example. Moreover, a trade name, a company name, or characters can be applied to a surface of the substance, or alternatively, the substance itself can take the form of such characters.

Moreover, as to the "insoluble substance," the words that its "specific gravity is approximately the same as that of the liquid for ink" means that the insoluble substance suspends in the liquid for ink, that is, a difference of their specific gravities is 15% or less, preferably 10% or less, and more preferably 5% or less.

If the difference is larger than 15%, the insoluble substance floats up and down so fast that it gives little interest. On the other hand, if the difference is smaller than 5%, the insoluble substance floats up and down so slowly that it may show innovative interest.

At least a part of the cylindrical side surface of the shaft member corresponding to the storing part of the liquid for ink is transparent. Moreover, since the insoluble substance contained in the storing part of the liquid for ink has approximately the same specific gravity as that of the liquid for ink, these substance may flutter in the liquid for ink when writing and is also suspended in the liquid when not writing. Therefore, the writing implement can display its new promotion ability which advertises an application of innovative design.

BRIEF DESCRIPTION OF THE DRAWINGS

FIG. 19 is a cross sectional view showing a whole of the thirteenth embodiment.

BEST MODE FOR CARRYING OUT THE INVENTION

Figure 1A:
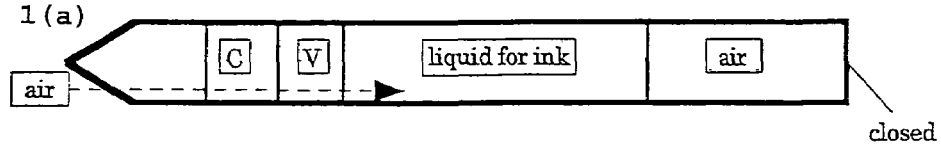
FIG. 1(a)–1(j) are conceptual diagram showing variations of components.
Figure 1B:
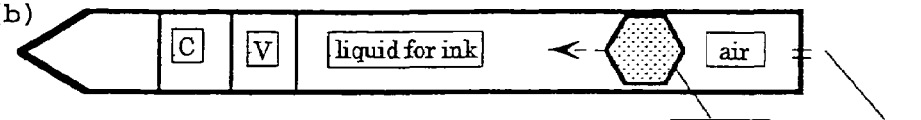
Figure 1C:
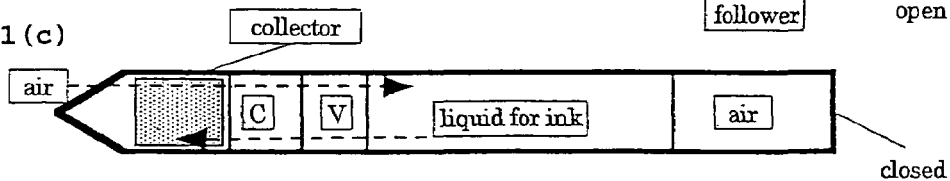
Figure 1D:
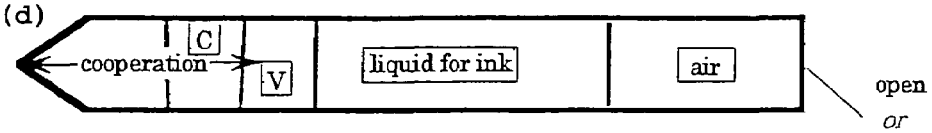
Figure 1E:
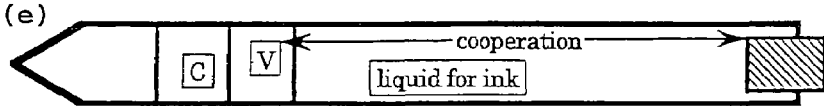
Figure 1F:
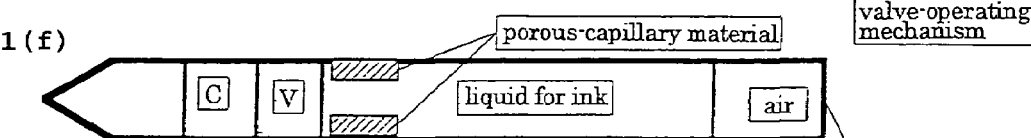
Figure 1G:
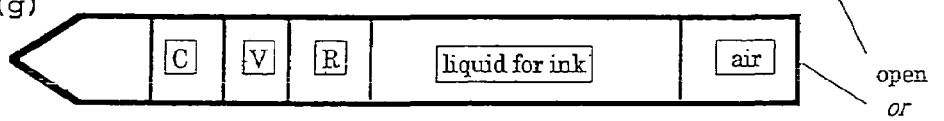
Figure 1H:
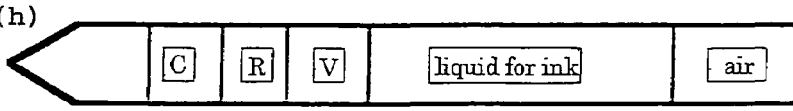
Figure 1I:
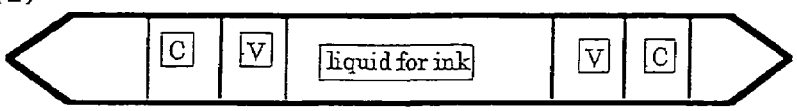
Figure 1J:
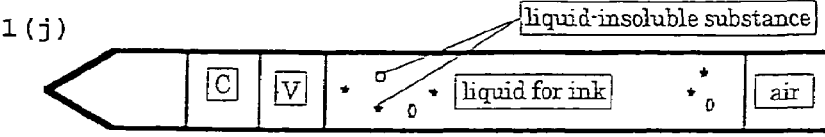
Figure 2:
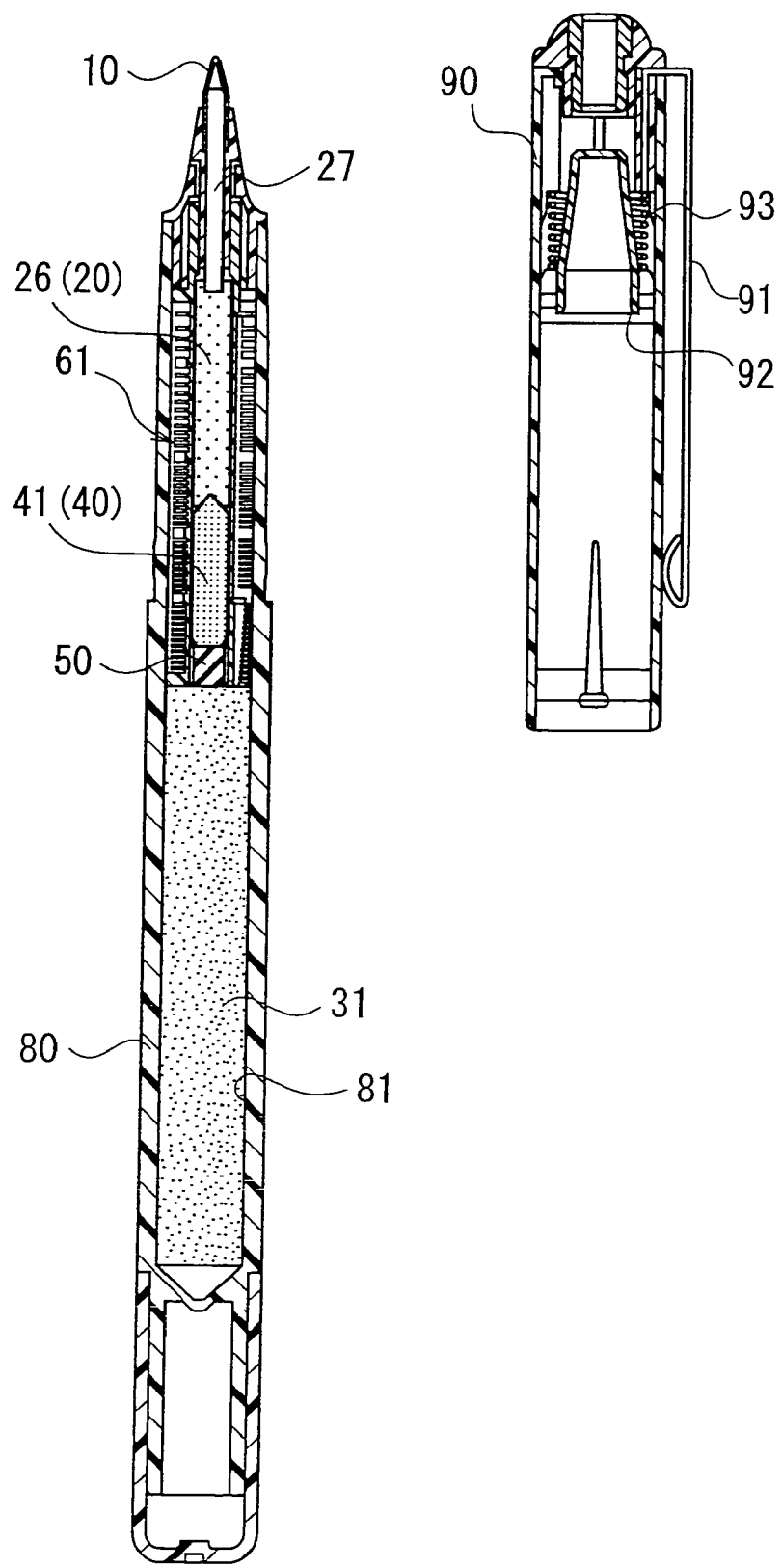
FIG. 2 is a cross sectional view showing a whole of the first embodiment.

As described below, with respect to the writing implement according to the present invention, its principal variations are described first and then each embodiment is explained in detail.

(FIG. 1)

There are three constitutive requirements as described above. According to the first requirement, liquid for ink and colorant which colors the liquid for ink are separately stored in a writing implement and the liquid for ink can be visually recognized. The first requirement should be the means to be achieved in all of "a" to "j." That is, at least a part of a cylindrical side surface of a shaft member corresponding to a part where the liquid for ink is stored is formed to be transparent.

According to the second requirement, it is necessary to provide means for mixing the liquid for ink with the colorant which colors the liquid for ink to supply to a pen tip when writing. In "a" to "e" are illustrated different means to be achieved.

Third, it is necessary to provide a structure in which colored ink having been colored with the colorant may not mix to the storing part of the liquid for ink when not writing. Each of "a" to "j" commonly adopts a valve member. In each of "e" to "j," different means to be achieved is illustrated as a structure in which colored ink having been colored with the colorant cannot mix to the storing part of the liquid for ink when not writing.

In "a," between the storing part of the liquid for ink and the colorant is located the valve member. Moreover, the storing part of the liquid for ink is provided with a pressure-regulating part for preventing an increase or decrease of a pressure in the storing part. Both of the ends of the storing part of the liquid for ink near to, and opposite to, the pen tip member are closed, and the above-described pressure-regulating part corresponds to the valve member.

In "b," between the storing part of the liquid for ink and the colorant is provided a valve member as is in the case of "a," but the pressure-regulating part is different. That is, both of the ends of the storing part of the liquid for ink near to, and opposite to, the pen tip member are open in order to communicate with outside air, and a follower which follows according to consumption of the liquid for ink is also provided.

Also in "c," between the storing part of the liquid for ink and the colorant is provided a valve member as is in the case of "a," but the pressure-regulating part is different. That is, both of the ends of the storing part of the liquid for ink near to, and opposite to, the pen tip member are closed. The above-described pressure-regulating part is a collector, which allows the outside air to flow in through the pen tip side and allows the liquid for ink or the colored ink, which is pushed out by the expanding air in the storing part of the liquid for ink, to flow into a space with little influence and to be held there.

Also in "d," between the storing part of the liquid for ink and the colorant is provided a valve member as is in the case of "a," but the function of the valve member is different. That is, the valve member is formed to be a structure which cooperates with to pen tip member so as to open when writing and to close when not writing.

Also in "e," between the storing part of the liquid for ink and the colorant is provided a valve member as is in the case of "a," but the function of the valve member is different. That is, the valve member is formed to be a structure provided with a valve-operating mechanism which can be operated to open and close. The valve-operating mechanism is, in the example in the figure, positioned at the end opposite to the pen tip member.

In "f," as a structure which prevents the colored ink having been colored with colorant from mixing to the storing part of the liquid for ink when not writing, in the storing part of the liquid for ink is, as well as the valve member, provided colorant-adsorbing material, concretely porous-capillary material, which adsorbs the colorant from the colored ink added with the colorant and penetrated into the storing part.

In "g," as a structure which prevents the colored ink having been colored with colorant from mixing to the storing part of the liquid for ink when not writing, between the valve member and the storing part of the liquid for ink is, as well as the valve member, provided a restriction member for preventing the colorant from moving toward the liquid for ink.

In "h," as a structure which prevents the colored ink having been colored with colorant from mixing to the storing part of the liquid for ink when not writing, between the valve member and the colorant is, as well as the valve member, provided a restriction member for preventing the colorant from moving toward the liquid for ink.

In "i," is shown a so-called double-headed writing implement. That is, the storing part of the liquid for ink is positioned between two valve members, and colorant is positioned at each valve member on the side of each pen tip.

In "j" is shown a writing implement wherein insoluble substance whose specific gravity is approximately the same as that of the liquid for ink is dispersed in the storing part of the liquid for ink.

FIRST EMBODIMENT

FIGS. 2 to 5 show the first embodiment. This embodiment corresponds to "c" shown in FIG. 1.

The writing implement comprises a cylindrical shaft member 80, a pen tip member 10 provided in front of the member 80 (above the member 80, in FIG. 2), and a cap 90 which covers the pen tip member 10, and also comprises a liquid-storing part 81 for storing liquid for ink 31 in an interior of a rear side of the shaft member 80. The liquid-storing part 81 is wholly made of synthetic resin such as polypropylene (PP) in order to show a colorless and transparent appearance so that an internal structure can be visually recognized. The shaft member 80 may not always be formed in a cylindrical shape, but its periphery may be formed in a polygonal shape.

Moreover, the shaft member 80 may not always be formed to be colorless and transparent, but may be formed to be colored and transparent, or translucent, for example. Further, the whole shaft member 80 may not always be formed to be transparent, but, for example, a transparent window may be provided at a part of the shaft member 80 so that its interior may be visually recognized.

Furthermore, as well as the whole shaft member 80 is formed to be transparent, on a periphery of its gripping position may be provided an elastic grip which is transparent or opaque, or on its surface may be applied some characters, graphic symbols, or patterns.

(Collector 61 as Pressure-regulating part)

In the liquid-storing part 81, the liquid for ink 31 flows into a pen tip member 10, but its rear end is closed. Moreover, with respect to the liquid-storing part 81, a pressure-regulating part 60 for preventing an increase or decrease of a pressure in the storing part is provided at a side of the pen tip member 10. The pressure-regulating part 60 is generally referred to as a "collector 61," and regulates a pressure while flowing the liquid into a space with little influence at a positive pressure as well as allowing the admission of air at a negative pressure. Further details are explained below.

Around the periphery of the collector 61 are provided a liquid-introducing groove 62 formed from a rear end on the side of the liquid-storing part 81 to the side of the pen tip member 10, an air-displacing groove 63 formed from a front end on the side of the pen tip member 10 to the side of the liquid-storing part 81, and many liquid-reserving grooves 64 formed to intersect with both of the liquid-introducing groove 62 and the air-displacing groove 63. The air-displacing groove 63 communicates with air channels 11 which are provided at the pen tip member 10, and secure the communication with outside of the writing implement.

Thereby the pressure change in the liquid-storing part 81 is regulated. That is, in case of a positive pressure where the pressure increases due to warmed air in the liquid-storing part 81, the liquid for ink 31 is allowed to flow into the liquid-reserving grooves 64. In case of a negative pressure where the pressure decreases due to the consumption of the liquid for ink 31 after writing, air is taken from outside of the writing implement through the air-displacing groove 63 and the air channels 11.

The collector 61 is made of synthetic resin such as ABS and formed to be entirely colorless and transparent. However, the collector 61 may not always be formed to be colorless and transparent. For example, it may be formed to be either colored and transparent, translucent, or opaque. That is, the collector 61 may be so formed that the inside thereof may or may not be visually recognized.

Through a center of the collector 61 is provided a penetrating channel 65 penetrating from a rear end thereof to a front end on the side of the pen tip. The penetrating channel 65 may not be always formed cylindrically, but, for example, an inner periphery of the penetrating channel 65 may be made polygonal. Moreover, for example, around an inner peripheral surface of the penetrating channel 65 may be provided with many grooves continuously running from the rear end on the side of the liquid-storing part 81 to the front end on the side of the pen tip member 10.

(Colorant-adsorbing core 41)

A cylindrical colorant-adsorbing core 41 is inserted into an end of the penetrating channel 65 on the side of the liquid-storing part 81. A colorant-adding core 26 for introducing the liquid for ink 31, which has been introduced from the liquid-storing part 81 through the colorant-adsorbing core 41, to the side of the pen tip member 10 is inserted into an end of the penetrating channel 65 on the side of the pen tip member 10 so that the front end of the colorant-adsorbing core 41 may be embedded into, or come into contact with, the rear end of the colorant-adding core 26.

The colorant-adsorbing core 41 is formed to be a porous and cylindrical column made of a powder type or a fiber type of activated carbon. It introduces the liquid for ink 31 from the colorant-adsorbing core 41 to the colorant-adding core 26 as well as prevents the colorant 20 from moving toward the side of the storing part of the liquid for ink 31 by adsorbing the colorant diffused from the colorant-adding core 26.

(Valve Member 50)

The valve member 50 is fixed at a rear end of the penetrating channel 65 so as to face to a rear end of the colorant-adsorbing core 41. Shown in detail in FIG. 5, this valve member 50 is, for example, approximately in a cylindrical shape rich in elasticity such as silicone rubber, and its cross section perpendicular to an axial direction is made into a radial pattern. That is, its radial portions come into contact closely with an inner wall of the penetrating channel 65, but other portions than the radial portions do not come into contact closely with the inner wall to form a groove part 51.

At an end of the valve member 50 on the side of the colorant-adsorbing core 41 is formed a valve part 52 taking a form of a thin-walled skirt tapered to gradually widen around its entire circumference. That is, this valve part 52 is so provided that its entire circumference comes into close contact with the inner wall of the penetrating channel 65. Then, the valve part 52 functions as a valve by disengaging from the inner wall of the penetrating channel to form a communicating channel due to a pressure difference between the front and the rear portions of penetrating channel 65 sectioned by the valve part 52. That is, the liquid for ink moves in only one direction in order to refill the colorant-adding core 26.

The valve member 50 is not limited to the example illustrated in the figures and, therefore, its material and shape, especially the shape of the valve part 51, maybe varied depending on the specification of the writing implement.

(Colorant 20)

The colorant-adding core 26 is impregnated with the colorant 20. Thus, the colorant 20 and the liquid for ink 31 are achieved to be stored separately. Moreover, the colorant 20 is made to be added to the liquid for ink 31 in process of introducing the liquid for ink to the pen tip member 10.

The colorant-adding core 26 is formed in a cylindrical columnar shape by a bundle of fibers. The bundle of fibers whose porosity is suitable for introducing the liquid for ink 31 is employed. Though, in the case of the conventional writing implement, a bundle of fibers whose porosity is 30% or more has been used as an ink-introducing core, it is preferable to use a bundle of fibers whose porosity is 40% or more. The is because the bundle of fibers is intended to be impregnated with the colorant 20.

The colorant-adding core 26 may not always be made of a bundle of fibers, but may be made of, for example, a porous body. Moreover, the colorant-adding core 26 may also be made of synthetic resin such as polyacetal, polypropylene, or polyester. In the case, around an outer peripheral surface of the core is provided many capillary grooves, slits, or concaved portions continuously running from an end to another, or, alternatively, inside the core is provided many capillary grooves, capillary channels, or concaved portions penetrating from an end to another.

The colorant-adding core 26 comes into contact with an ink-introducing core 27 for introducing the colored ink into the pen tip member 10.

(Pen Tip Member)

As for a pen tip member 10 positioned at a front portion of the writing implement, various types can be adopted as appropriate depending on the type of the writing implement. The embodiment employs a ball pen tip. The ball pen tip freely and rotatably holds a tip ball 12 at the front end thereof, from which the colored ink seeps out in response to the rotation of the ball 12 to write. The colored ink is prepared by the liquid for ink 31 passing through the colorant-adding core 26 and the ink-introducing core 27. The liquid for ink 31 is introduced to the colorant-adding core 26 and the ink-introducing core 27 after passing through the valve member 50. The front end of the ink-introducing core 27 is inserted into an interior of the ball pen tip 10, and thus, the ink having passed through the colorant-adding core 26 and the ink-introducing core 27 is introduced to the tip ball 12.

The pen tip member 10 may also be formed of a writing tip made of felt, a writing tip made of a bundle of fibers, or an elongated tubular writing tip used for a needle pen.

If the writing implement is left for a long time without using it for writing, the colorant diffuses into the liquid for ink, so that there is a danger that its appearance becomes similar to that of the conventional one.

Thus, the colorant-adsorbing core 41 is formed to be a porous and cylindrical column made of powder or fibrous matter mainly consisted of activated carbon for the purpose of capturing and adsorbing the colorant during its diffusion, which introduces the liquid for ink 31 from the colorant-adsorbing core 41 to the colorant-adding core 26, adsorbs the colorant diffused from the colorant-adding core 26, and prevents the colorant 20 from moving toward the liquid-storing part 81.

When not writing, a backward flow of the ink to which the liquid for ink 31 and the colorant 40 contained in front of and behind the valve part 52 have been added is isolated. Moreover, as for the ink to which the colorant 20 has been added, the colorant 20 is adsorbed by the colorant-adsorbing core 41. Thus, the liquid-storing part 81 of the liquid for ink 31 is protected twice by the valve member 50 and the colorant-adsorbing core 41. Therefore, its color and the thickness can be stably maintained for a long time.

(Liquid for Ink and Colorant)

In the present embodiment, vehicle matter of the conventional ink is used for the liquid for ink 31.

The colorant 20 of the present embodiment corresponds to dye or pigment of the conventional ink, and is mainly composed of the conventional ink other than the vehicle matter. A user of the writing implement according to the present embodiment can visually recognize the liquid for ink 31 which has not been colored yet. When writing, on the other hand, the colored ink seeps out from the pen tip member 10, so that the user can have a unique feeling that the appearance of the implement is not consistent with the feeling of use.

(Cap)

The writing implement comprises a cap 90 in the shape of a cylinder an end of which is closed, in order to protect the pen tip member 10 and to prevent drying. The cap 90 comprises a clip 91 for clipping to a breast pocket or the like, and a pen tip enclosing part 92 conformed to a contour of the pen tip member 10 in its interior. The pen tip enclosing part 92 can move forward and back in an axial direction by an enclosing spring 93, so that the pen tip member 10 can be hermetically enclosed to a high degree and is prevented from drying caused by the air channel 11 provided at the pen tip member 10 and by the tip ball 12.

The way of storing the colorant 20 in the writing implement is not always limited to the case where the colorant-adding core 26 is impregnated with the colorant 20. For example, though not shown in the figures, a pore provided at a center of the collector 61 may be filled with the colorant prepared in solid or liquid form, or the colorant prepared in liquid form may be applied to an inner peripheral surface of the pore to be solidified. Furthermore, the colorant prepared in liquid form may be applied to the outer peripheral surface of the ink-introducing core 27 to be assimilated, or the colorant prepared in solid form may be embedded in the ink-introducing core 27. Further, the colorant in liquid form may be stored in the other potion than the ink storing part 81 such that the colorant can be gradually added to the liquid for ink 31 according to the flow of the liquid for ink 31.

Although in the present embodiment is shown a writing implement comprising the collector 61, the present invention is not always limited to the writing implement having such a collector, but can be used for, e.g., a sign pen, a marking pen, or a ballpoint pen of a direct-ink-supply type without such a collector.

SECOND EMBODIMENT

Figure 6:
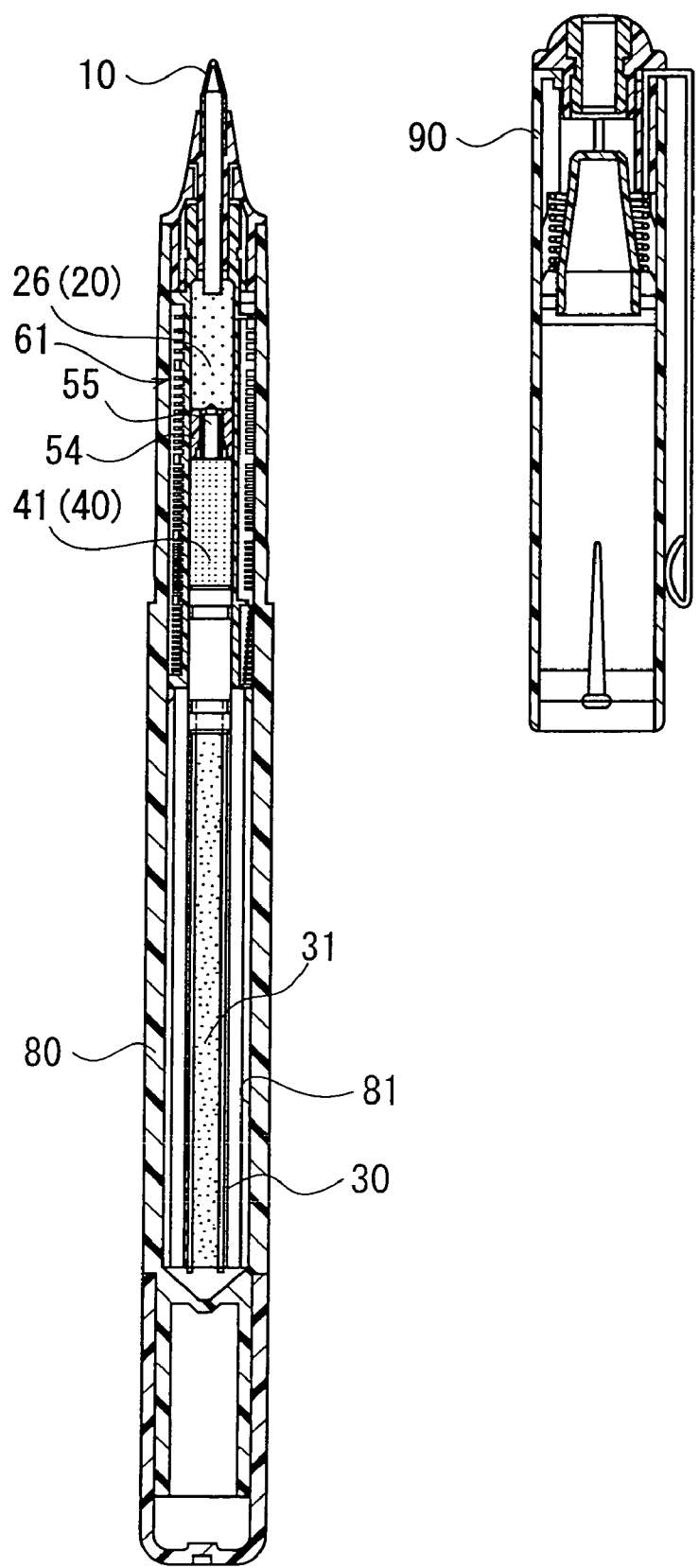
FIG. 6 is a cross sectional view showing a whole of the second embodiment.
Figure 7:
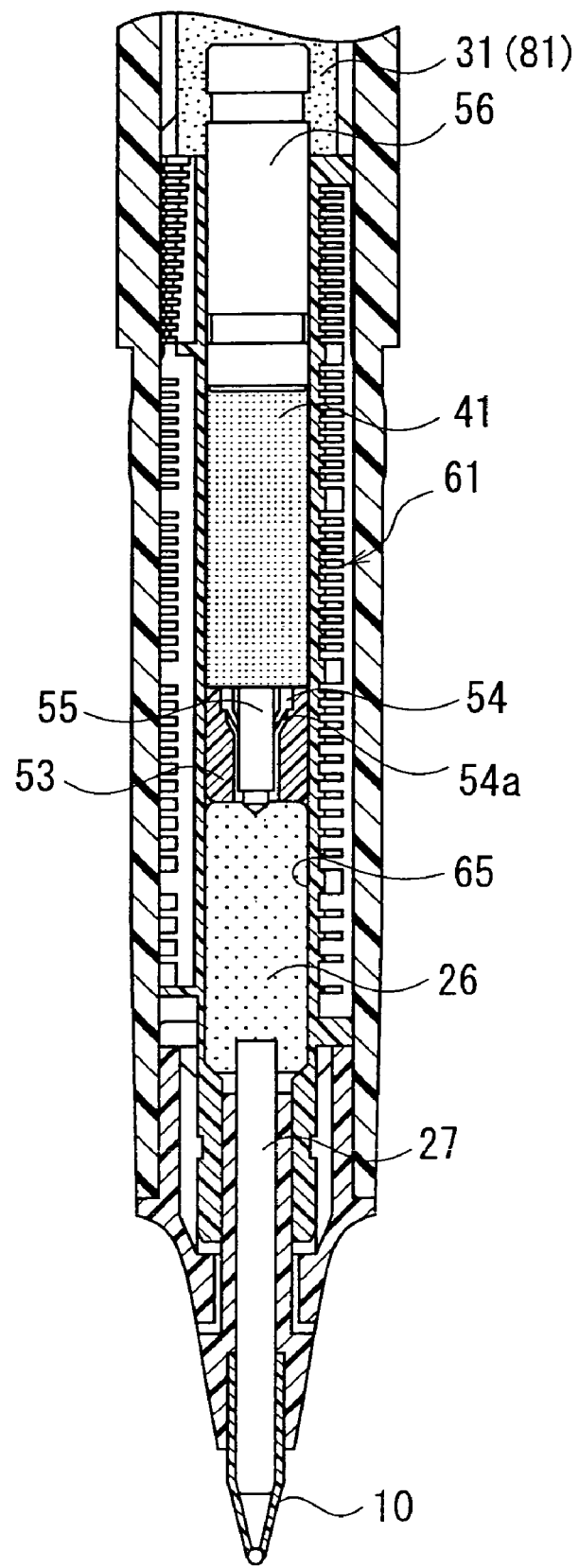
FIG. 7 is a cross sectional view showing a principal part of the second embodiment.

FIGS. 6 and 7 show the second embodiment of the writing implement according to the present invention, and corresponds to the type "g" shown in FIG. 1.

This writing implement comprises a cylindrical shaft member 80, and a collector 61 is fixed in the shaft member 80 on the side of a pen tip member 10 in order to prevent the liquid for ink 31 from leaking from the pen tip member 10 due to a pressure change in the liquid-storing part.

The difference from the first embodiment lies in that a valve mechanism is provided approximately in the middle of an axial direction of a penetrating hole 65 of the collector 61, that a rear end of the valve mechanism is fixed to the colorant-adsorbing core 41 and a front end to the colorant-adding core 26, and further that a collector core 56 is positioned at a rear side of the colorant-adsorbing core 41 and fixed at a rear end of the penetrating hole 65. Moreover, the liquid for ink 31 is stored in a liquid cartridge 30 in the liquid-storing part 81 of the shaft member 80.

As for the above-described valve mechanism, an outer peripheral portion of a bush 53 is provided approximately in the middle of an axial direction of the penetrating hole 65 of the collector 61, and closely attached to an inner surface of the hole 65. A plug 55 is inserted into an axial hole of the bush 53, and a valve body 54 made of highly elastic material such as silicone rubber is provided between the outer peripheral portion of the plug 55 and the axial hole of the bush 53. An outer peripheral portion of the valve body 54 is fixed at a rear portion of the axial hole of the bush 53. Moreover, in an inner hole of the valve body 54, and between the side of the pen tip member 10 and the plug in the axial hole of the bush 53, is formed a gap communicating from the rear end of the valve body 54 to the front end of the bush 53, through which the liquid for ink 31 passes. Moreover, at an end of the valve body at the side of the pen tip member 10 is formed a thin-walled valve part 54a whose entire circumference is tapered to reduce its diameter, and the valve member 54a is so formed that its entire circumference comes into close contact with the outer peripheral portion of the plug 55. The valve part 54a deforms by a small difference of pressure between the front and the rear portions sectioned in the above-described gap, and is disengaged from the outer peripheral portion of the plug 55 to form a channel.

The above-described collector core 56 is made of a porous core or a bundle of fibers and, therefore, the core 56 is achieved to function to fix the colorant-adsorbing core 41, to introduce the liquid for ink 31 to the colorant-adsorbing core 41. It also functions as a further safety device for preventing the colorant 20 not having been adsorbed by the colorant-adsorbing core 41 from mixing into the liquid for ink 31 in the liquid-storing part and into liquid-reserving grooves of the collector 61.

As the ink is consumed by writing, a pressure at the rear end of the colorant-adding core 26 gradually and slightly decreases, so that the valve part 54a deforms by a pressure difference between the front and the rear portions in the gap sectioned by the valve part 54a. Then the valve part 54a is disengaged from the outer peripheral portion of the plug 55 to form a channel. Consequently, the liquid for ink 31 is supplied from the colorant-adsorbing core 41 to the colorant-adding core 26 by a corresponding consumed amount.

According to the above-described constitution, the liquid present in front of and the behind the valve part 54a is separated from each other when not writing. Moreover, when writing, the liquid is shown to move in only one direction to refill the liquid for ink 31. Since the valve mechanism having the valve body 54 is provided at the rear end of the colorant-adding core 26 even in the absence of the colorant-adsorbing core 41, it is also possible to provide the liquid-storing part 81 at the rear side of the valve body 54. In this second embodiment, therefore, the user can visually recognize the liquid for ink 31 which is not colored. On the other hand, since the colored ink seeps out from the pen tip member 10 when writing, the user can have a unique feeling that an appearance of the writing implement is not consistent with the feeling of use, and such a situation can be maintained for a long time.

In addition, when the colorant-adsorbing core 41 and the collector core 56 are provided at the rear side of the valve body 54, these components constitute a double or triple isolation mechanism for preventing the colorant from penetrating into the liquid for ink 31. Consequently, the color is stably maintained when the liquid for ink 31 is colorless and transparent or the liquid for ink 31 is colored.

THIRD EMBODIMENT

Figure 8:
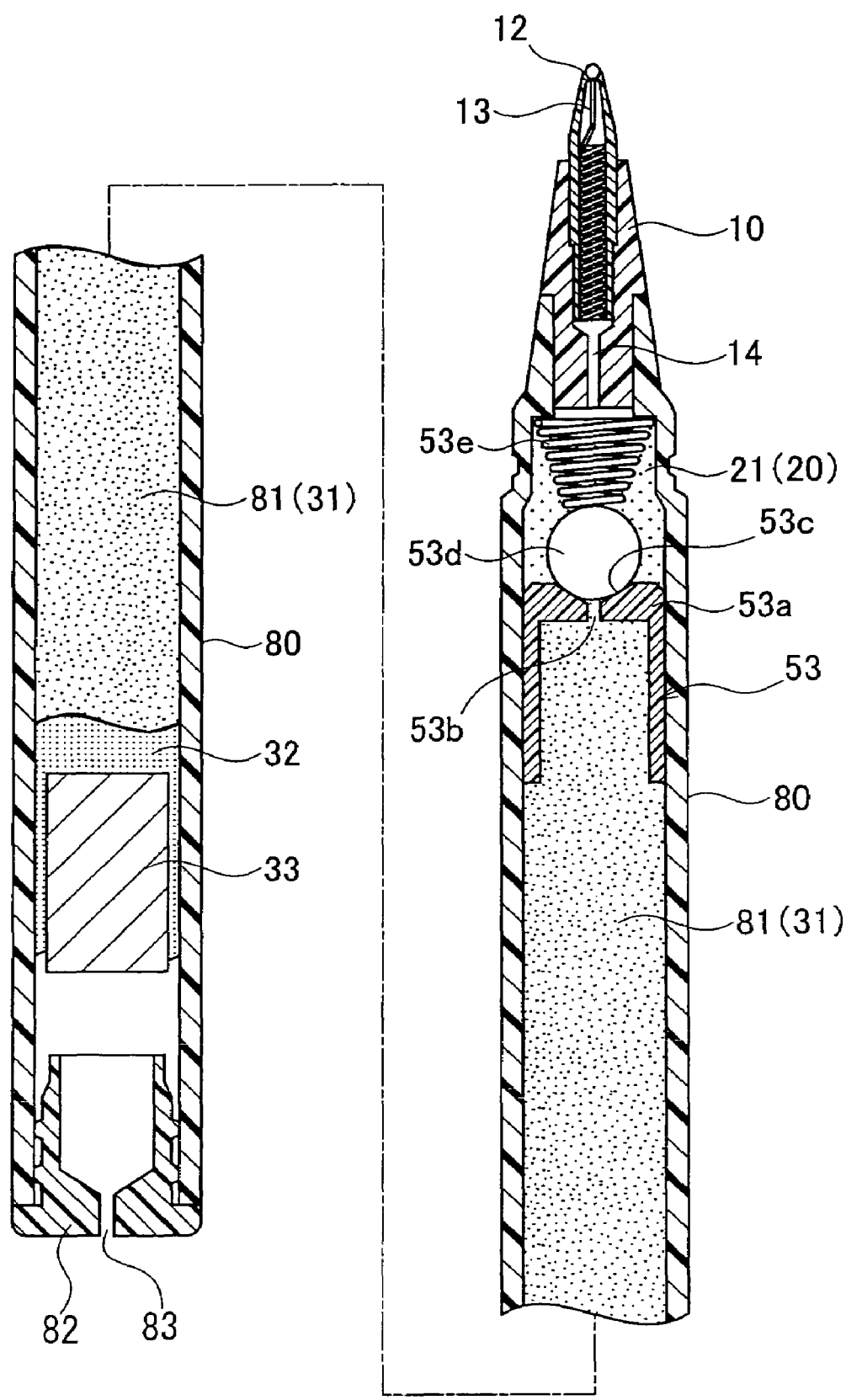
FIG. 8 is a cross sectional view showing a whole of the third embodiment.

FIG. 8 shows the third embodiment. This embodiment corresponds to the type "d" shown in FIG. 1.

As for the writing implement according to this embodiment, the shaft member 80 is formed by a transparent or translucent cylindrical body made of synthetic resin, and the front end of the shaft member 80 is fixed to a pen tip member 10 including a ball pen tip and the opposite end to a tail plug 82. The tail plug 82 has a communicating hole 83 for communicating the storing part of transparent liquid for ink 31 in the shaft member 80 with the outside air.

A bush 53 is fixed at the pen tip member 10 side of the shaft member 80 such that a colorant-storing part 21 is provided between the bush 53 and the pen tip member 10. In this colorant-storing part 21 is stored the colorant 20 for coloring the liquid for ink 31.

At a side of the colorant-storing part 21 opposite to the pen tip member 10 is provided the liquid-storing part 81 for storing the liquid for ink 31. Moreover, at the rear end of the liquid for ink 31 is provided greasy follower 32 (including gel-like one) which can move following the consumption of the liquid for ink 31. The follower 32 can be colored, mixed with various fillers therein; or submerged with a resinous follower bar 33 which has approximately the same specific gravity as the follower 32 to emphasize its visual unpredictability as well as the effect of preventing its deformation.

The colorant 20 is filled as the appropriate size of a solid matter or particulates. Moreover, if desired, the appropriate size, weight, or number of stirrer(s) can be inserted in the above-described colorant-storing part 21 in order to facilitate the mixing and dissolving of the colorant 20 into the liquid for ink 31.

The bush 53 is formed of a cylindrical body with a partition 53a at its front end, and in the front center of the partition 53a is formed a valve body seat 53c in a tapered or spherical shape.

At the pen tip member 10 side of the above-described liquid-storing part 81 is formed an introducing hole 53b for communicating with the bush 53. At the introducing hole 53b is positioned a ball valve 53d which occludes the introducing hole 53b by being biased toward the valve body seat 53c. It is a spring 53e positioned being compressed between the pen tip member 10 side of the colorant-storing part 21 and the ball valve 53d that biases the ball valve 53d.

When the pressure is decreased by the consumption of the ink after writing, the blocking condition of the introducing hole 53b effected by the ball valve 53d is slightly alleviated, and thus the colorant-storing part 21 is refilled with the liquid for ink 31.

The pen tip member 10 comprises a tip ball 12, a ball spring 13 biasing the tip ball 12 toward the outside, and an ink channel 14 communicating the tip ball 12 with the colorant-storing part 21.

The above-described constitution is suitable for the gel-like liquid for ink 31 to which an appropriate viscosity is imparted. That is, it is possible to keep the condition in which the liquid for ink 31 and the colorant 20 are separated by the partition 53a and the ball valve 53d. Moreover, by inserting the stirrer, the colorant is facilitated to be mixed and dissolved into the liquid for ink 31 to be prepared as the colored ink in the colorant-storing part 21.

Since the colorant gradually diffuses into an interface between the liquid for ink 31 and the colorant 20 over time, an innovative appearance can be maintained by adopting a design in which the bush 53 is formed by an opaque cylindrical body, and the rear end of the cylindrical body is appropriately set at the backward of the introducing hole 53b which becomes the interface, for example.

Although the partition 53a is formed by fixing the bush 53 in the shaft member 80, the partition may be integrated with an inner surface of the shaft member.

Even when the liquid for aqueous ink with a low viscosity (e.g. vehicle matter) is used as the liquid for ink for example, the above-described structure can be basically employed. In this case, however, if the writing implement is left for a long time without using it for writing, there is a danger that the colorant diffuses into the liquid for ink.

Therefore, a colorant-adsorbing core is provided between the liquid for ink and the introducing hole 53c, for example, for the purpose of capturing and adsorbing the colorant during its diffusion. The colorant-adsorbing core is made of a powder type or fiber type of activated carbon which is made into a porous and cylindrical column, through which the liquid for ink is allowed to be introduced from the liquid-storing part to the colorant-adding core, and which adsorbs the diffused colorant to prevent the colorant from moving toward the liquid-storing part.

FOURTH EMBODIMENT

Figure 9:
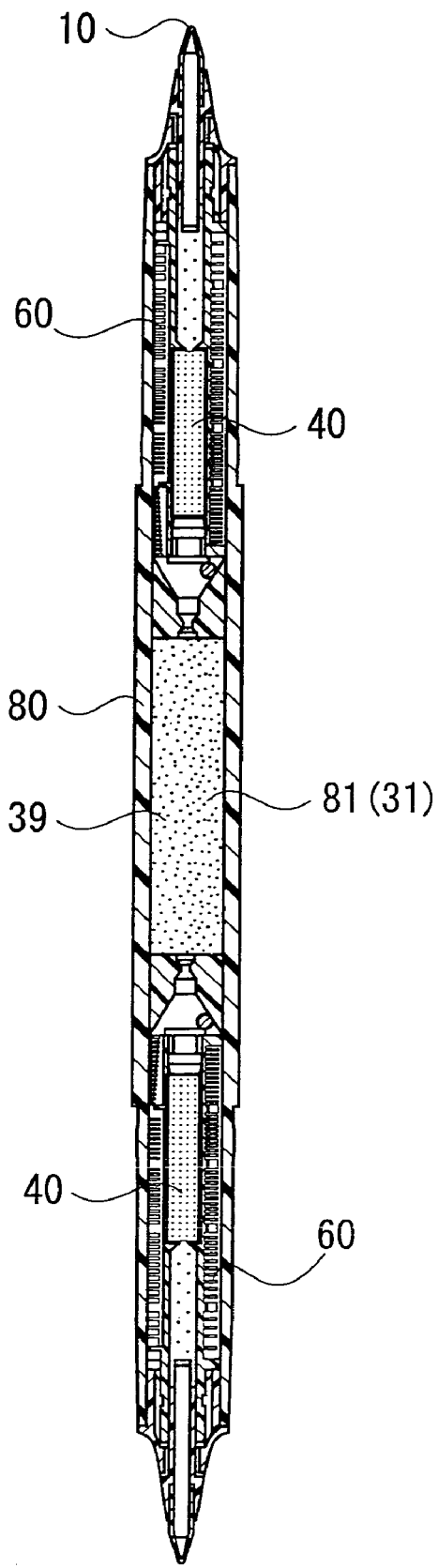
FIG. 9 shows a double-headed writing implement as the fourth embodiment.
Figure 10:
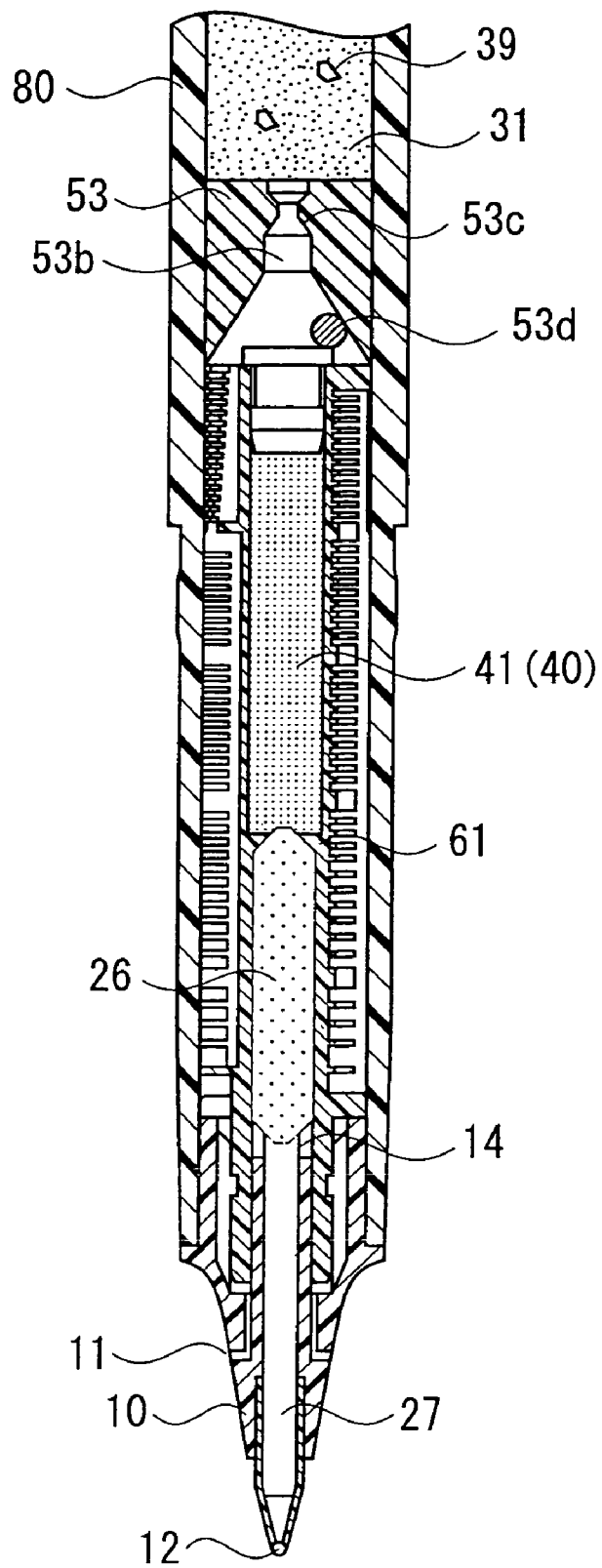
FIG. 10 shows a double-headed writing implement as the fourth embodiment.

A double-headed writing implement is described as the fourth embodiment with reference to FIGS. 9 and 10. The embodiment corresponds to the type "i" shown in FIG. 1.

This double-headed writing implement is, as shown in FIG. 9, formed by comprising a transparent cylindrical shaft member 80, pen tip members 10, 10 fixed at both ends of the shaft member 80, a liquid-storing part 81 positioned in the vicinity of the center of the shaft member 80, restriction members 40, 40 each positioned between the liquid-storing part 81 and each of the pen tip members 10, 10 for feeding the liquid for ink 31 contained in the liquid-storing part 81 into each of the pen tip members 10, 10 and for restricting the movement of the colorant 20, and a pressure-regulating part 60, 60 for preventing an increase-or decrease in the pressure in the storing part.

Further explanation is given below referring to FIG. 10 focusing on characteristic features.

Figure 3:
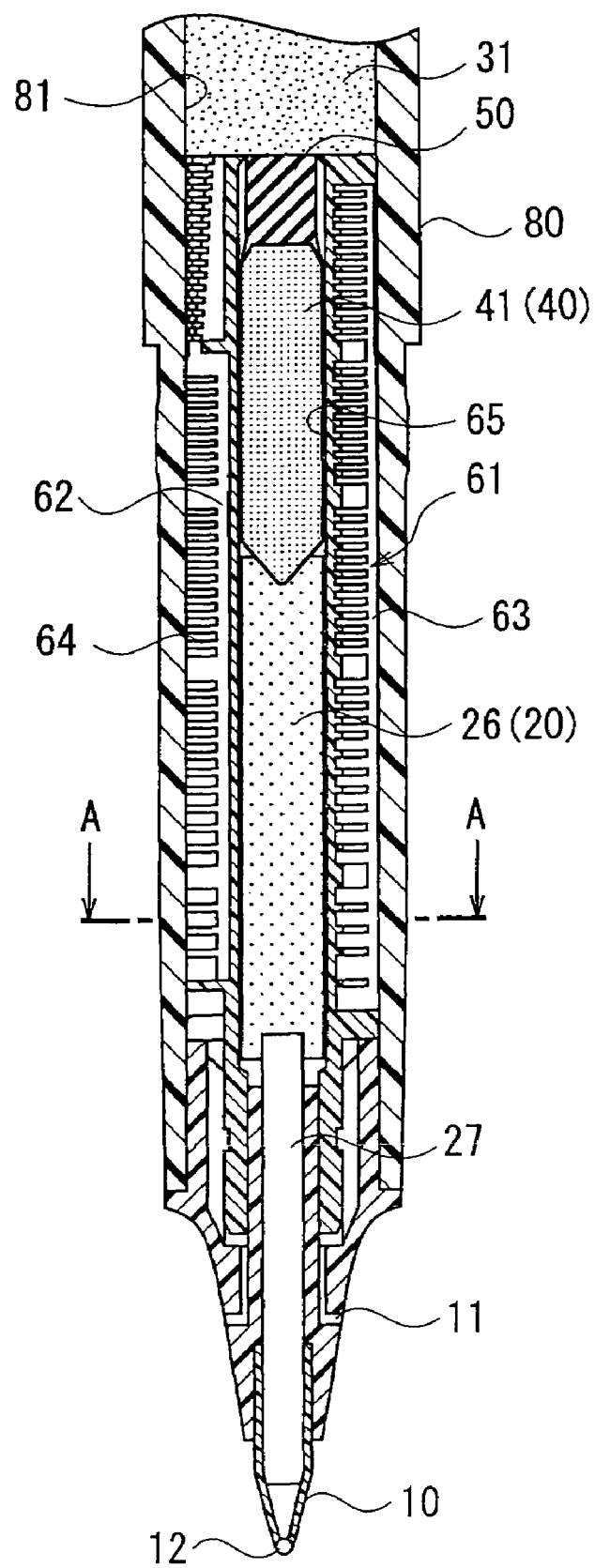
FIG. 3 is a cross sectional view showing a principal part of the first embodiment.
Figure 4:
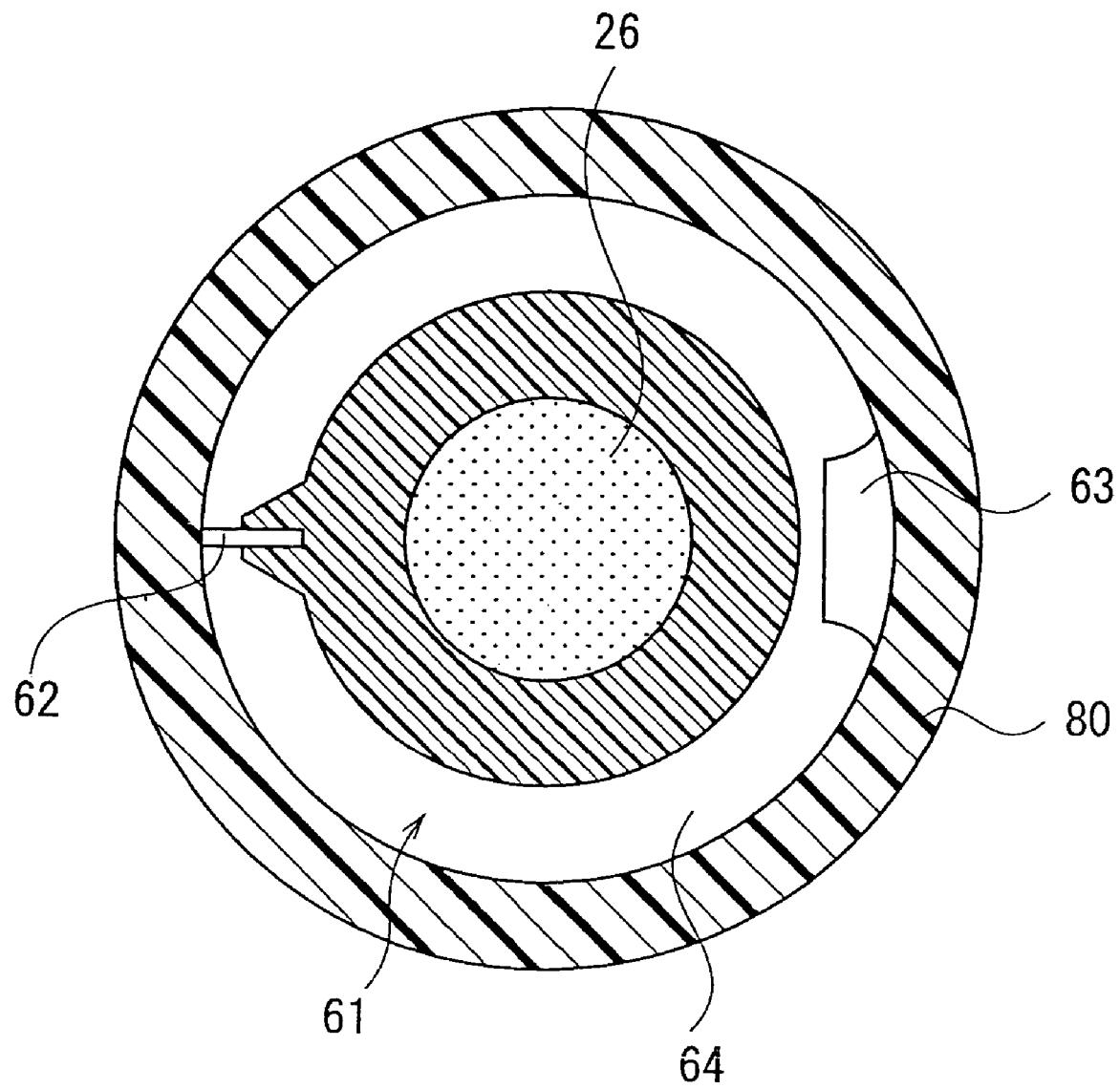
FIG. 4 shows a section along a line A—A in FIG. 3.
Figure 5:
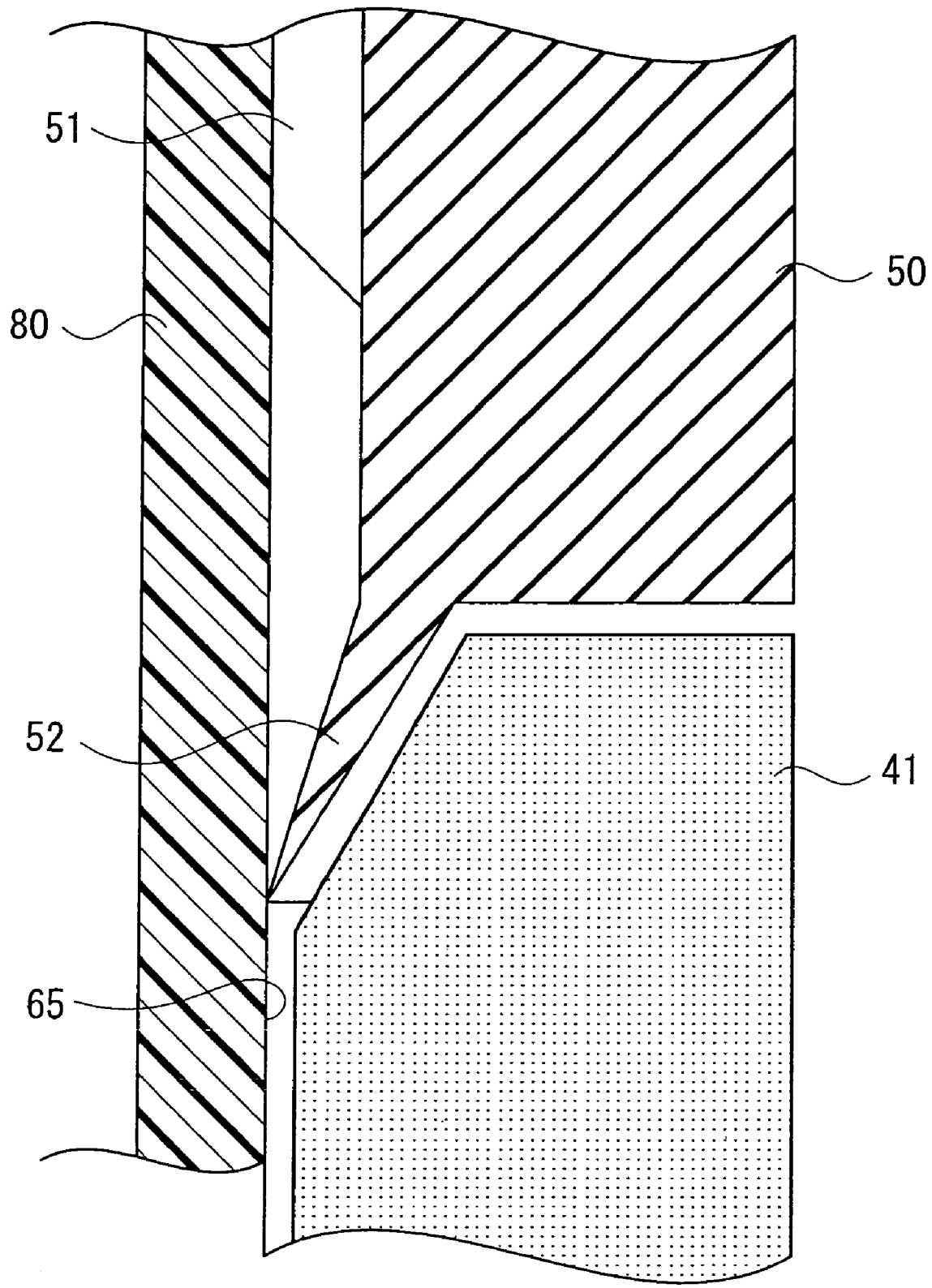
FIG. 5 is an enlarged sectional view showing a principal part of the first embodiment.

Since a structure shown in FIG. 10 is similar to the first embodiment shown in FIG. 3, etc., detailed descriptions of the pen tip members 10, the air channel 11, a tip ball 12, an ink-drawing core 27, an ink channel 14, the colorant-adding core 26, the restriction member 40, the collector 61, etc. are omitted.

The shape of the valve member 50 is greatly different from that used in the first embodiment shown in FIG. 3, etc.

Further detailed explanation is given herein. The valve member 50 employed in the first embodiment is made of highly elastic material such as silicone rubber, whereas, in the fourth embodiment, the valve member 50 is formed to have a bush 53 and a ball valve 53*d* both of which hardly deform.

An introducing hole 53*b* is provided at the center of the bush 53 for communicating the liquid for ink 31 contained in the liquid-storing part 81 with the pen tip member 10. A valve body seat 53*c* which is tapered to widen toward the pen tip member 10 is formed in this introducing hole 53*b*, for the purpose of making the ball valve 53*d* abut thereon. When the ball valve 53*d* abuts on the valve body seat 53*c* (when the pen tip member 10 which is not used is positioned upward), the air flow is shut off. Moreover, since the pen tip member 10 is positioned downward when writing, the ball valve 53*d* also moves toward the pen tip member 10, thus the valve enters into an opening condition, and the liquid for ink 31 is supplied to the pen tip member 10.

Though this embodiment has described the ball valve 53*d*, the valve member is not limited to a spherical shape, but may be in conical shape.

The double-headed writing implement according to this embodiment contains, in the liquid for ink 31, thin sheets made of plastics, small objects made of plastics, or thin films made of metal as insoluble substance 39. The insoluble substance 39 has the same specific gravity as that of the liquid for ink 31, and is fluttering in the liquid for ink 31 when writing. Therefore, this writing implement has an innovative appearance, and also corresponds to a type "j" shown in FIG. 1.

FIFTH EMBODIMENT

The fifth embodiment in which the present invention is used for a felt pen will now be described with reference to FIG. 11. This embodiment corresponds to the type "d" shown in FIG. 1.

This embodiment comprises a cylindrical shaft member 80 and a felt tip as a pen tip member 10 which allows colored ink to seep out from the end of the pen tip member 10, the pen tip member 10 being fixed at one end of the shaft member 80. Although the storing part of the liquid for ink is not illustrated in this figure, the storing part is positioned at a side of an interior of the shaft member 80 opposite to the pen tip member 10, and a cylindrical side surface of the shaft member 80 is made of transparent resin.

An ink-drawing core 27 which adsorbs the colored ink prepared by the added liquid for ink is fixed to the pen tip member 10, and a transmission shaft 28 is connected to a side of the ink-drawing core 27 opposite to the pen tip member 10. In addition, at a side of the transmission shaft 28 opposite to the ink-drawing core 27 is provided an insert member 28*a* having a reduced diameter to be inserted and fixed to a valve member 50 described below.

A connecting portion between the ink-drawing core 27 and the transmission shaft 28 creates a step due to a reduced diameter of the transmission shaft 28, and, thus, the colorant 20 to be added to the liquid for ink to prepare the colored ink is positioned in a space formed in the presence of the step.

The present embodiment comprises the valve member 50 for supplying a desired amount of liquid for ink as required as well as for shutting off the stream of the liquid for ink when not writing. The valve member 50 is formed in a cylindrical body 50*a* into which the above-described transmission shaft 28 is inserted. The cylindrical body 50*a* is positioned between the colorant 20 and the storing part of the liquid for ink, and an inner cylindrical body 50*b* is inserted to the colorant 20 side of the cylindrical body 50*a* for reducing an inner diameter of the cylindrical body 50*a*. Moreover, a step 50*c* is formed at an end of the cylindrical body 50*a* opposite to the inner cylindrical body 50*b* for reducing a diameter of the cylindrical body 50*a*.

Inside the cylindrical body 50*a* is mounted a valve body 54, which is connected to the transmission shaft 28 by inserting the insert part 28*a*. The valve body 54 comprises a spring-application part 54*a* over which a coiled spring 53*e* is slipped to be made abut against the step 50*c*, and a valve part 52 which is made abut against the inner cylindrical body 50*b*.

Figure 11A:
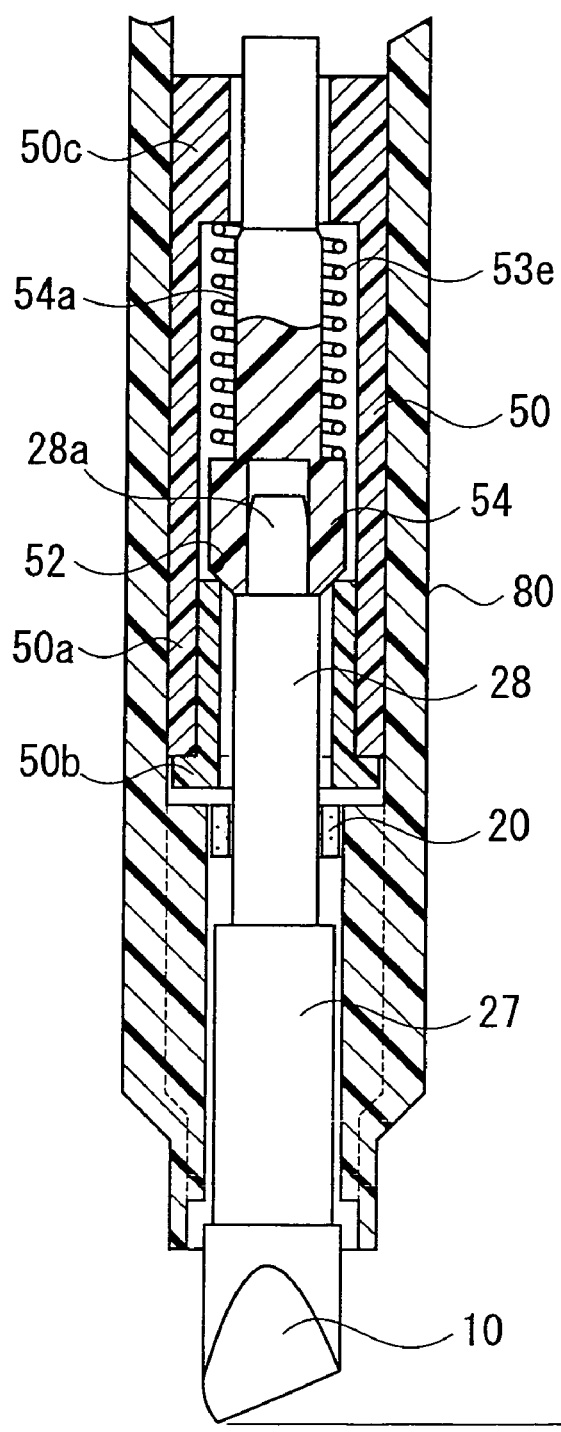
FIGS. 11(a) and 11(b) are cross sectional view showing the fifth embodiment.
Figure 11B:
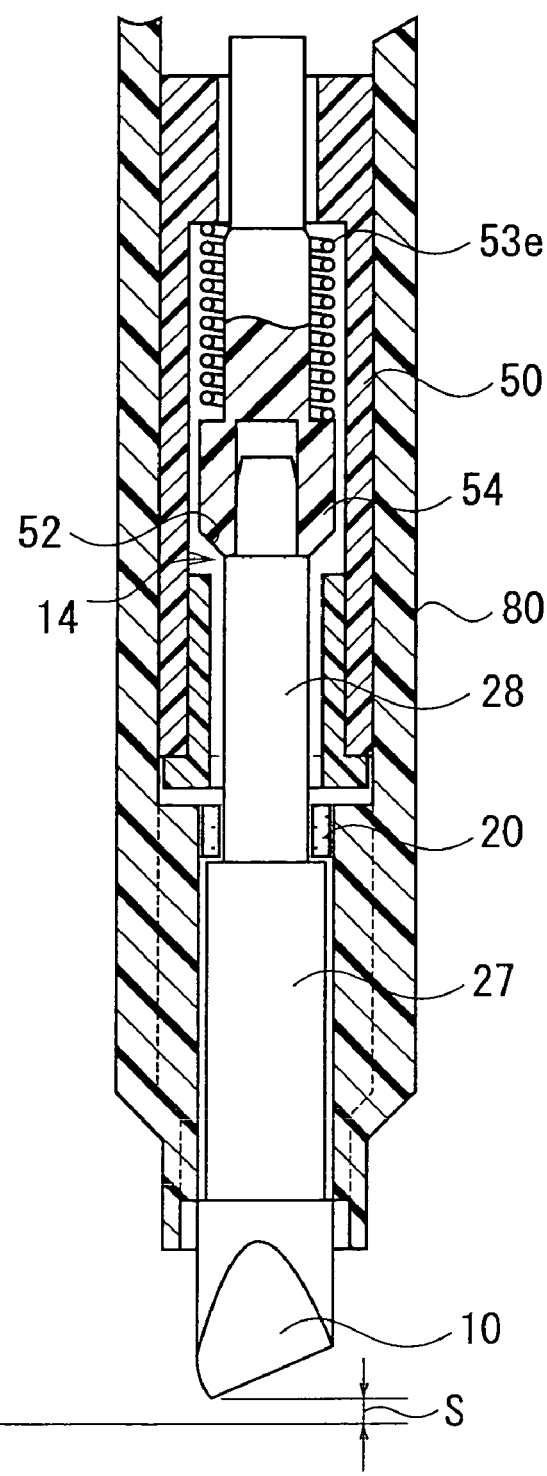

When not writing ((a) in FIG. 11), the valve part 52 is made abut on the inner cylindrical body 50*b* by the resiliency of the compressed spring 53*e*.

When writing ((b) in FIG. 11), an ink channel 14 is formed between the valve part 52 and the inner cylindrical body 50*b* when the pen tip member 10 is pressed against a paper surface stronger than the resiliency of the spring 53*e*. In this case, the liquid for ink from the ink channel 14 passes through a gap between the transmission shaft 28 and the inner cylindrical body 50*b*, and reaches the colorant 20. Then the colorant 20 is added to the liquid for ink to prepare the colored ink, and the colored ink penetrates into the ink-drawing core 27, and finally the colored ink seeps out from the pen tip member 10.

In FIG. 11, "s" represents a stroke of the valve-operating mechanism.

Provided that the colorant 20 is added to the liquid for ink in order to prepare the colored ink and that writing is completed with the colored ink remained, a force of pressing the pen tip member 10 against the paper surface is lost, so that the valve part 52 is made abut against the inner cylindrical body 50*b* by the resiliency of the spring 53*e*. Thus, the backward flow of the ink is prevented. Consequently, movement of the colored ink to the storing part of the liquid for ink is regulated, and the clarity of the storing part of the liquid for ink is maintained for a long time.

SIXTH EMBODIMENT

Figure 12:
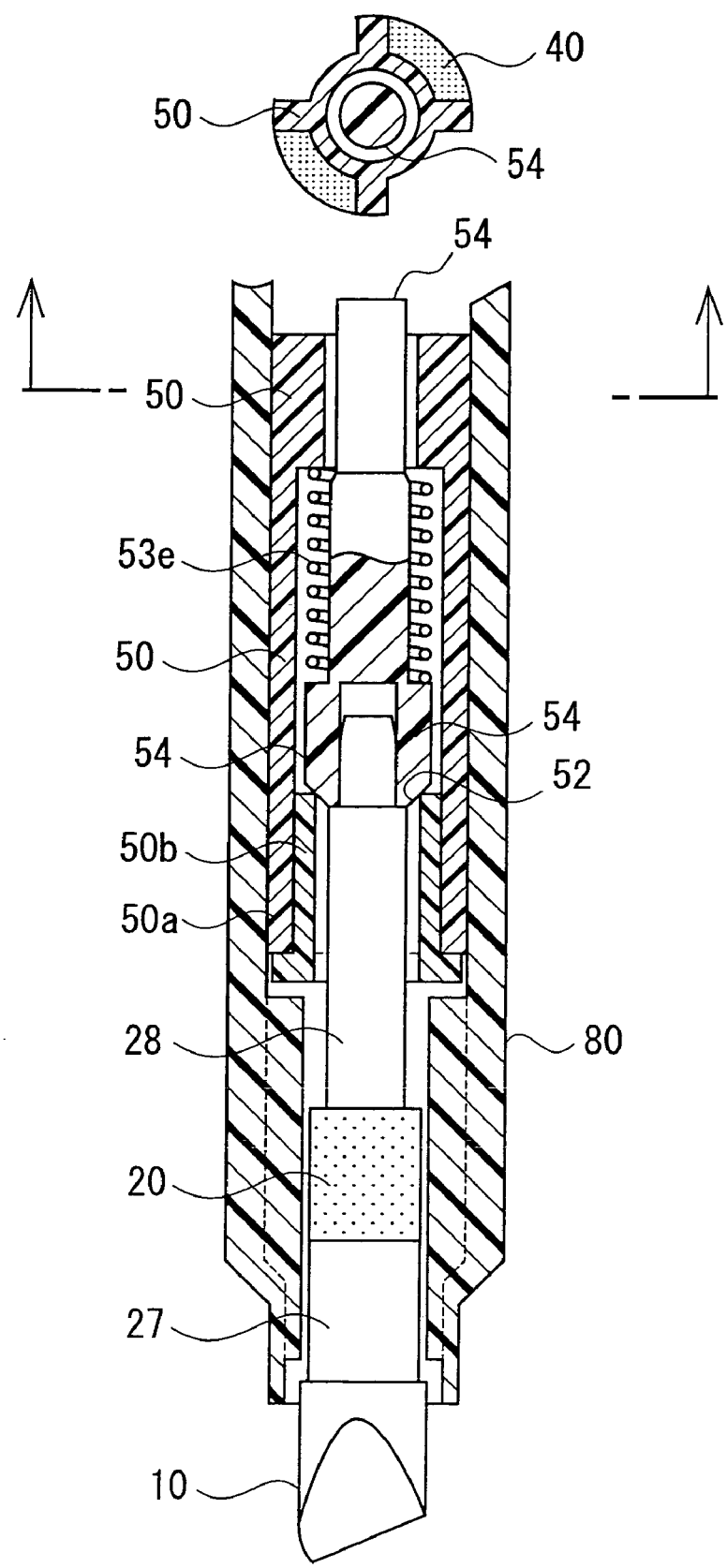
FIG. 12 is a cross sectional view showing a whole of the sixth embodiment.

The sixth embodiment shown in FIG. 12 is similar to the fifth embodiment, except that the colorant 20 is positioned at a different portion and that a restriction member 40 is mounted. In this context, this embodiment corresponds to either the type "h" or "g" shown in FIG. 1.

First, an axial length of the ink-drawing core 27 is made shorter in order to widen a space in which the colorant 20 is located. This ensures that a region in which the colored ink is prepared by adding the colorant 20 to the liquid for ink becomes larger.

Moreover, the restriction member 40 whose principal component is activated carbon is applied to a side of the valve body 54 opposite to the pen tip member 10. The restriction member 40 is applied between four radial projections from an outer peripheral of the cylindrical body, whose cross section perpendicular to an axial direction of the valve body 54 is shown in the figure. Consequently, the movement of the colored ink toward the storing part of the liquid for ink, which has been insufficiently prevented by the valve member 50, can be more sufficiently prevented.

SEVENTH EMBODIMENT

Figure 13:
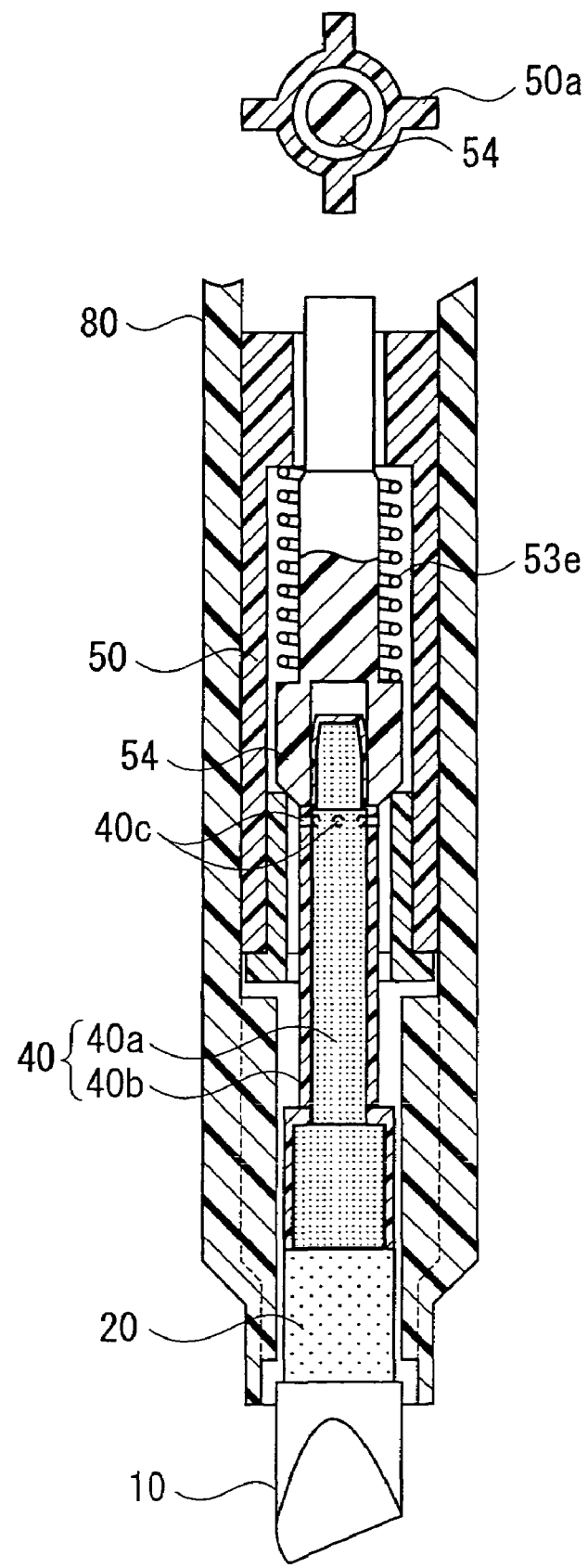
FIG. 13 is a cross sectional view showing a whole of the seventh embodiment.

The seventh embodiment shown in FIG. 13 is similar to the sixth embodiment, except for a different shape and a different location of the restriction member 40. This embodiment corresponds to the type "h" shown in FIG. 1.

In the present embodiment, the location and the space where the transmission shaft 28 occupies in the sixth embodiment is kept as it is.

On the other hand, the part corresponding to both the transmission shaft 28 and the rear half of the ink-drawing core 27 opposite to the pen tip member 10a in the sixth embodiment is referred to as restriction body 40a, while the part corresponding to the front half of the ink-drawing core 27 near to the pen tip member 10a in the sixth embodiment is impregnated with colorant. A sheath 40b covers outer peripheral surface of the restriction body 40a. Sheath holes 40c are formed at a side of the sheath 40b opposite to the pen tip member 10. When the valve is opened, the liquid for ink 31 penetrates through the sheath holes 40c, and is added with the colorant 20 before seeping out from the pen tip member 10 as colored ink.

Since the restriction body 40a covered with the sheath 40b is provided at a side of the colorant 20 opposite to the pen tip member 10 as well as the valve, the colorant 20 is prevented from diffusing into the liquid for ink 31.

EIGHTH EMBODIMENT

Figure 14:
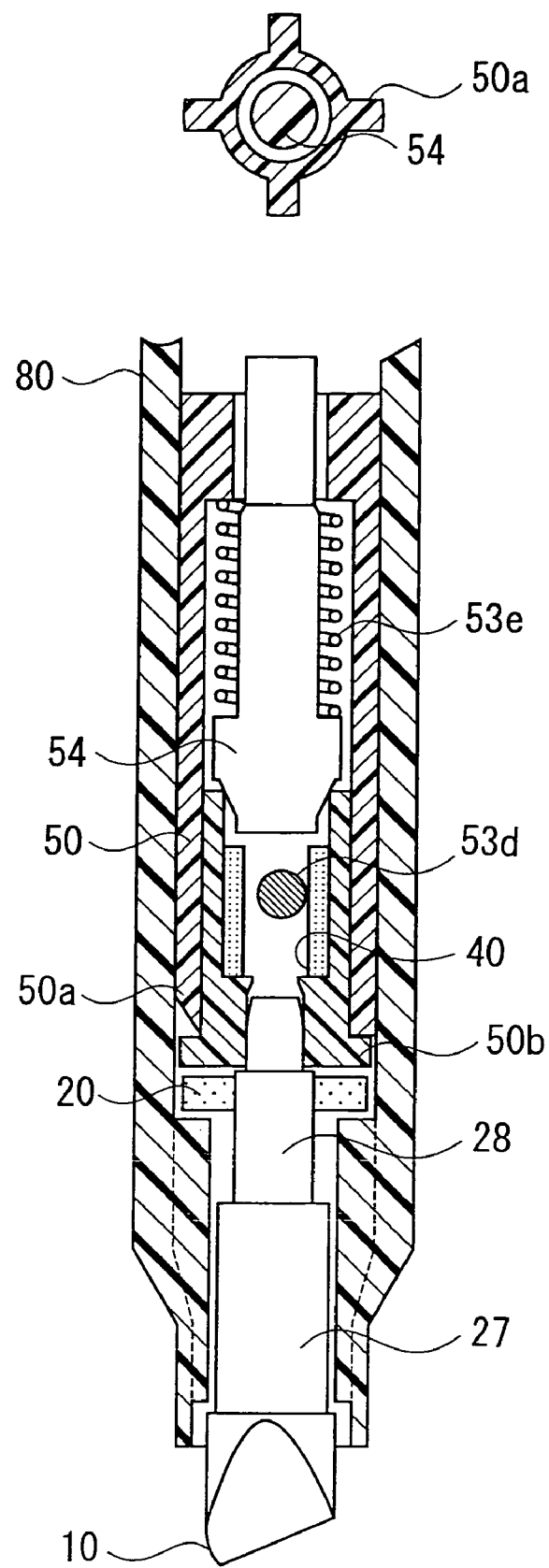
FIG. 14 is a cross sectional view showing a whole of the eighth embodiment.

In the eighth embodiment shown in FIG. 14, the operation to open and close the valve member 50 is left to a ball valve 53d which hits a valve body 54 when the user shakes the entire writing implement in its axial direction. This embodiment corresponds to the type "h" shown in FIG. 1.

A pen tip member 10 is connected to the valve member 50 through an ink-drawing core 27 and the transmission shaft 28, and colorant 20 is positioned at the valve member 50 side of the transmission shaft 28. The valve member 50 comprises a cylindrical body 50a, an inner cylindrical body 50b inserted into an end of the cylindrical body 50a on the side of the pen tip member 10, a valve body 54 inserted into an end of the inner cylindrical body 50b opposite to the pen tip member 10, and a spring 53e biasing the valve body 54 toward the pen tip member 10. Between the valve body 54 and the transmission shaft 28 inserted into is formed a space into which the liquid for ink flows in and in which the ball valve 53d and the restriction member 40 are positioned.

When the user of this writing implement feels that the ink does not smoothly seep out, the user shakes the entire writing implement in its axial direction with the pen tip member 10 kept downward. Then, at the instant when the ball valve 53d hits the valve body 54 to overcome the resiliency of the spring 53e, the valve opens and the liquid for ink flows thereinto. Consequently, the colorant 20 is added to the liquid for ink and the colored ink can seep out from the pen tip member 10.

In addition, the air displacement function (introduction of outside air into the shaft member 80) is left to the ink-drawing core 27 through which air can pass. In order to achieve the function, porosity of the ink-drawing core 27 is adjusted as appropriate.

NINTH EMBODIMENT

Figure 15:
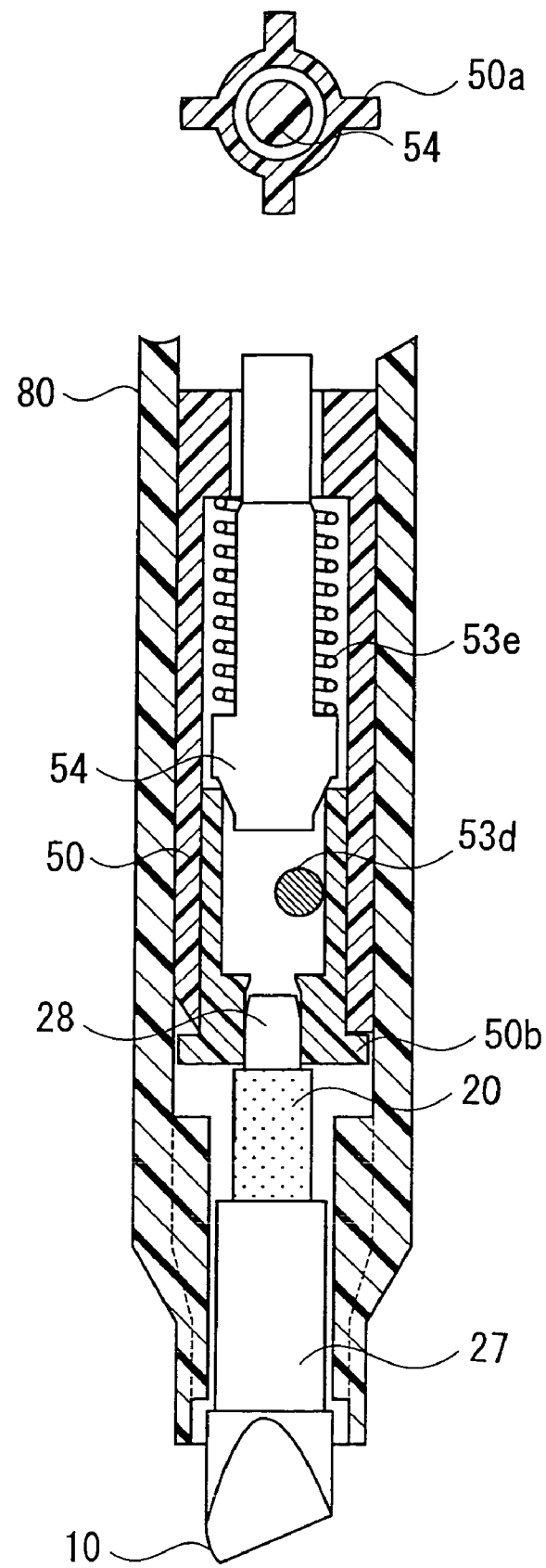
FIG. 15 is a cross sectional view showing a whole of the ninth embodiment.

The ninth embodiment shown in FIG. 15 is similar to the eighth embodiment, except for a location of the colorant 20 and for the absence of the restriction member 40. This embodiment corresponds to the type "d" shown in FIG. 1, and does not have a restriction member 40. Moreover, the colorant 20 is positioned around the transmission shaft 28 such that an area where the flowing liquid for ink comes into contact with the colorant 20 becomes larger than that of the eighth embodiment.

TENTH EMBODIMENT

Figure 16:
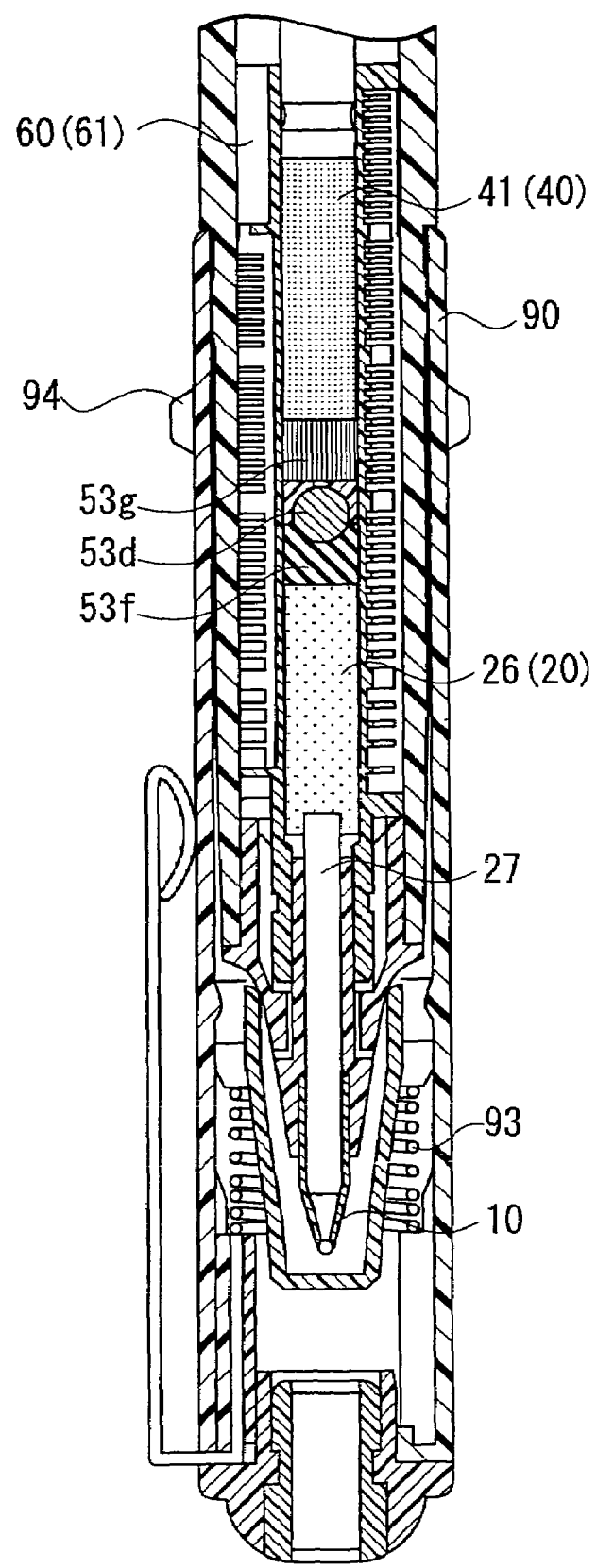
FIG. 16 is a cross sectional view showing a whole of the tenth embodiment.

The tenth embodiment shown in FIG. 16 is characterized by employing a valve member which functions when a cap 90 is put on the writing implement. This embodiment corresponds to the type "h" shown in FIG. 1.

A ball valve 53d is used as the valve member. Moreover, a ball-valve-movement restrictor 53f is positioned at a pen tip member 10 side of the ball valve 53d, and a filter 53g is positioned at a side opposite to the pen tip member 10.

The cap 90 has a structure by which the valve member opens when appropriately put on the pen tip member 10. That is, for the purpose of opening the ball valve 53d inserted in the shaft member 10 by a magnetic force, a ball-valve-attracting member 94 made of magnetic material is fixed to the cap 90. This is achieved by using magnet for either the ball valve 53d or the ball-valve-attracting member 94, or both. A location of the ball-valve-attracting member 94 is biased a little far from the pen tip member 10 relative to the position where the valve is to open when putting the cap 90 on.

According to the above-described structure, when the cap 90 is put on, the ball valve 53d is attracted to the ball-valve-attracting member 94 whether the pen tip member is directed downward or upward, thus the valve can be kept open. Moreover, when the cap 90 is removed, the ball valve 53d can move freely. For example, when writing, the pen tip member 10 is directed downward and the valve member opens. Therefore, the liquid for ink is supplied to the colorant-adding core 26 to allow the colored ink to seep out from the pen tip member 10.

ELEVENTH EMBODIMENT

Figure 17:
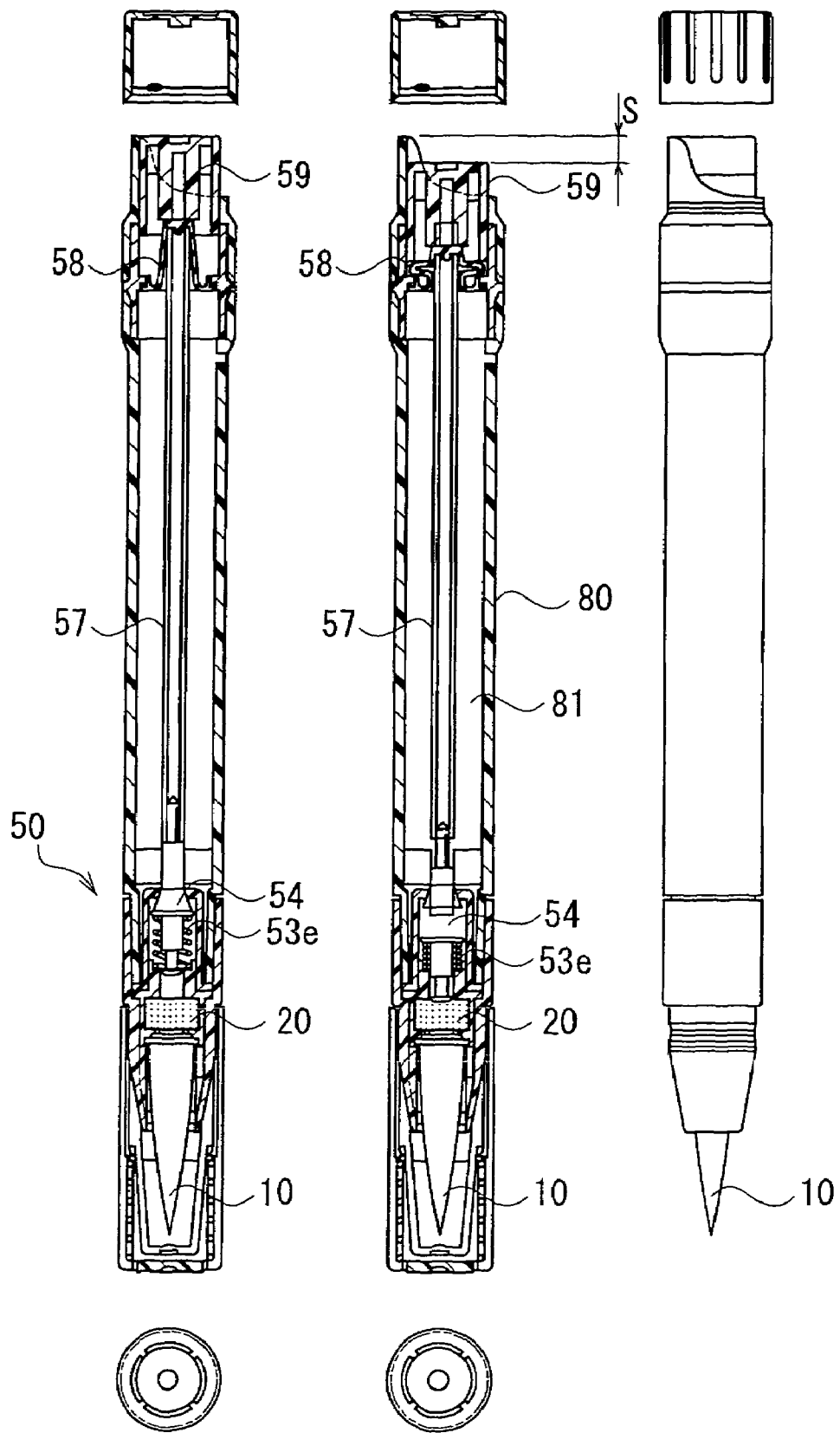
FIGS. 17(a)–17(b) are cross sectional view showing the eleventh embodiment.
FIG. 17(c) is a view showing a whole of the eleventh embodiment.

The eleventh embodiment shown in FIG. 17 comprises an operation part 59 or the like at an end of a shaft member 80 opposite to a pen tip member 10, as a valve-operating mechanism for operating a valve member 50 by the user of the writing implement. This embodiment corresponds to the type "e" shown in FIG. 1.

Each embodiment shown in FIG. 11, etc. has a valve-operating mechanism which advances and retreats in accordance whether the pen tip member 10 is pressed against a paper surface or not. Since, however, a pen tip member 10 employed in the present embodiment is the one used in a so-called "brush pen" not suitable for an operation to press the pen tip member 10 against the paper surface, at an end of the shaft member 80 opposite the pen tip member 10 is provided an operation part 59, etc. In addition, the colorant 20 is positioned between the pen tip member 10 and the valve member 50.

In addition, it is, of course, possible to employ the valve-operating mechanism which is provided with the operation part 59, etc. at an end of the shaft member 80 opposite the pen tip member 10 even when the pen tip member 10 is not for a "brush pen."

The operation part 59 is usually pressed toward outside by a resiliency of a rod spring 58 (FIG. 17(a)), but, when the operation part 59 is pressed down against the resiliency, a valve rod 57 incorporated to be connected to a valve body 54 through an axis of the shaft member 80 opens the valve body 54 of the valve member 50 (FIG. 17(b)). Then, the liquid for ink is supplied from a storing part of the liquid for ink, not illustrated in the figure to clarify the valve rod 57, etc., to the colorant 20. Consequently, the colored ink is supplied to the pen tip member 10. The valve body 54 usually closes by the spring 53e, so that the liquid for ink in the storing part can maintain its clarity for a long time.

In FIG. 17, "s" represents a stroke of the valve-operating mechanism.

Although a negative pressure is built up in an interior of the shaft member 10 in accordance with the consumption of the liquid for ink, outside air is supplied into the shaft member 10 through the pen tip member 10, the colorant 20, and the valve member 50 when the valve is opened, such that the negative pressure is alleviated. In other words, when the brush pen or the like is used as the pen tip member 10, material of an appropriate porosity to supply the outside air into the shaft member 10 is selected.

TWELFTH EMBODIMENT

Figure 18:
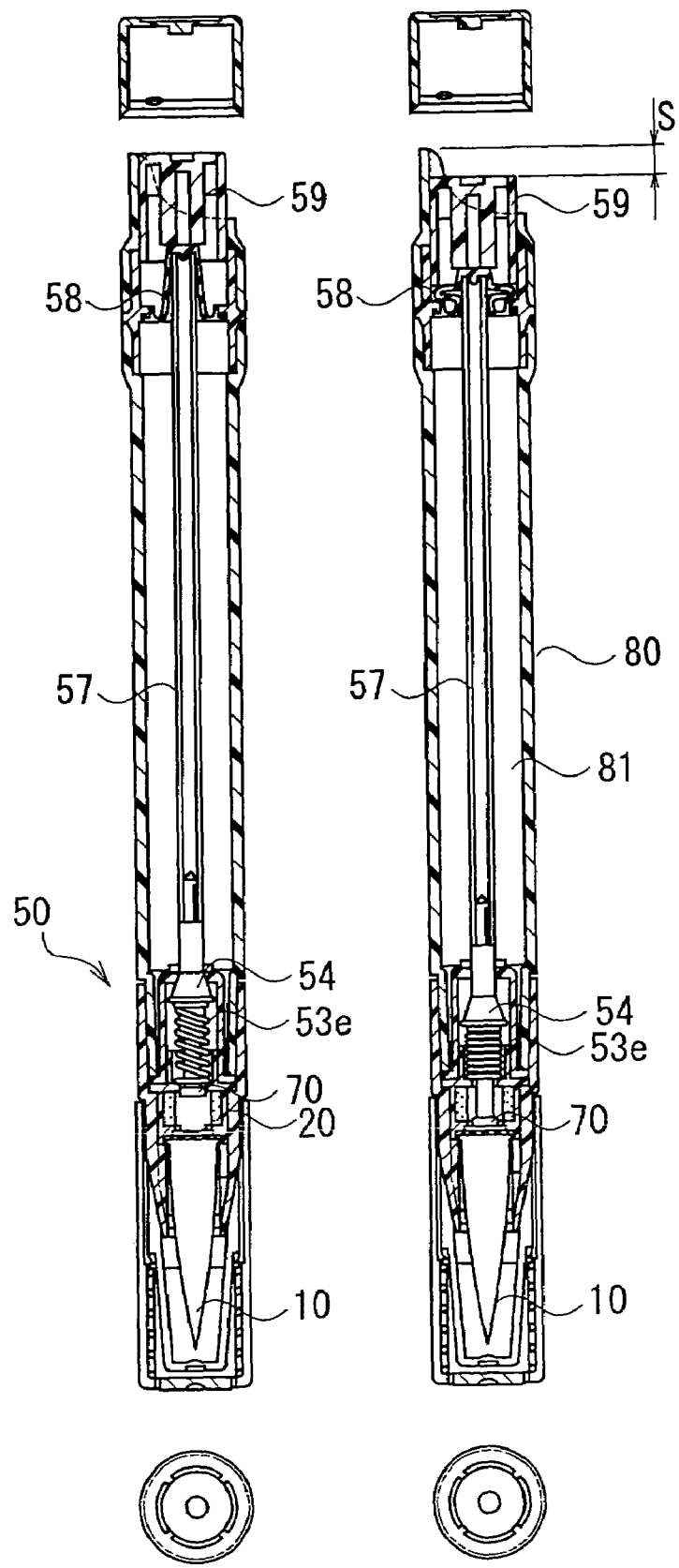
FIG. 18 is a cross sectional view showing a whole of the twelfth embodiment.

The twelfth embodiment shown in FIG. 18 is similar to the eleventh embodiment, except for that the valve mechanism of the valve member 50 is made to be a so-called double valve, which corresponds to the type "e" shown in FIG. 1.

Opposing to a valve body 54 provided at a valve rod 57 side, intervened by a spring 53e, a secondary valve 70 is provided on a pen tip member 10 side of the valve member 50. The secondary valve 70 opens (FIG. 18(b)) or closes (FIG. 18(a)) in accordance with the valve body 54 in response to the operation of the valve-operating mechanism. In the figure, "s" represents a stroke of the valve-operating mechanism.

Providing the secondary valve 70 which opens and closes in cooperation with the valve body 54, a back flow of the colored ink is more reliably prevented and the liquid for ink contained in the storing part can maintain its clarity for a long time.

THIRTEENTH EMBODIMENT

The thirteenth embodiment shown in FIG. 19 is similar to the twelfth embodiment, except for that a pen tip member 10 for a ballpoint pen is used, which corresponds to the type "e" shown in FIG. 1.

FIG. 19(a) shows that both a valve body 54 and the secondary valve 70 are opened, and FIG. 19(b) shows that both the valve body 54 and the secondary valve 70 are closed. In the figure, "s" represents a stroke of a valve-operating mechanism.

In addition, the colorant 20, which is in cylindrical shape, is placed between the valve member 50 and the pen tip member 10. A center hole of the cylindrical colorant 20 also functions as an air channel.

When the valve-operating mechanism is operated in case of an increased pressure in the storing part of the liquid for ink increases in accordance with the increase in temperature, the liquid for ink suddenly flows into the pen tip member. If the pen tip member is the one for a felt pen or a brush pen, the pressure is transferred to the pen tip member itself and relieved. In such a case, if the pressure decreases in accordance with writing action, air can be supplied from the outside. However, the pen tip member 10 is the one for a ballpoint pen as in the case of this embodiment, it is necessary to provide a control mechanism made of another material for regulating the increase in pressure or decrease in pressure caused by writing. Thus, the pen tip member 10 is provided with a sponge-like pen tip adsorber 15 covering an ink channel 14, an adsorber cover 16 for preventing the ink adsorbed by the pen tip adsorber 15 from escaping outside, and a cover hole 17 which is a penetrating channel provided at the adsorber cover 16 allowing for the distribution of air but preventing the ink from leaking out.

Further detailed description with respect to water, water-soluble organic solvent, lubricant, preservative, anti-corrosive, pH-controlling agent, anti-drying agent, thickener, emulsion, etc. used for preparing the liquid for ink is given below.

(Water)

It is possible to use, e.g., purified water, distilled water, or ion-exchange water as to the water.

(Water-soluble Organic Solvent)

As to the water-soluble organic solvent, it is possible to use, for example, (1) alcohols such as isopropyl alcohol or butyl alcohol, (2) ketones such as acetone or methyl ethyl ketone, (3) ethers such as tetrahydrofuran or dioxane, (4) esters such as ethyl acetate or propylene carbonate, (5) polyvalent alcohols such as ethylene glycol, propylene glycol, butylene glycol, diethylene glycol, triethylene glycol, polyethylene glycol, polypropylene glycol, 1,5-pentanediol, 1,2, 6-hexanetriol, thiodiglycol, or glycerol, (6) lower alkyl ethers of polyvalent alcohols such as ethylene glycol monomethylether, ethylene glycol dimethylether, ethylene glycol monoethylether, ethylene glycol diethylether, ethylene glycol mono-n-propylether, or ethylene glycol monoisopropylether, (7) nitrogen-containing compounds such as urea, pyrrolidone, or N-methyl-2-pyrrolidone, (8) sulfur-containing compounds such as dimethyl sulfoxide or tetramethylene sulfoxide, (9) glycerin derivatives such as ethylene oxide adducts of polyglycerin, etc.

Each of these may be used alone, or two or more may be used in combination. Although a total amount of the solvent to be used is not specifically limited, it is preferable that the amount of an auxiliary solvent is at least 0.5% by weight.

(Lubricant)

As to the lubricant, it is possible to use, for example, phosphate esters of polyoxyethylene alkyl ethers, phosphate esters of polyoxyethylene alkyl allyl ethers, potassium linoleate, sodium ricinate, potassium oleate, sodium oleate, glycerine fatty acid esters, polyglycerin fatty acid esters, propylene glycol fatty acid esters, pentaerythritol fatty acid esters, polyoxyethylene sorbitan fatty acid esters, pentaerythritol fatty acid esters, polyoxyethylene sorbitan fatty acid esters, polyoxylethylene sorbit fatty acid esters, polyoxyethylene glycerin fatty acid esters, polyethylene glycol fatty acid esters, polyoxyethylene alkyl ethers, polyoxyethylene phytosterol, polyoxyethylene polyoxypropylene alkyl ethers, polyoxyethylene alkyl phenyl ethers, polyoxyethylene castor oil, polyoxyethylene lanolin, polyoxyethylene lanolin alcohols, polyoxyethylene alkylamines, polyoxyethylene fatty acid amides, polyoxyethylene alkyl phenyl formaldehyde condensates, etc.

Each of these may be used alone, or two or more may be used in combination.

(Preservative)

As to the preservative, it is possible to use, for example, sodium dehydroacetate, 1,2-benzothiazoline-3-one, sodium benzoate, 2-pyridinethiol-1-oxide sodium salt, phenol, etc.

Each of these may be used alone, or two or more may be used in combination.

(Anti-Corrosive)

As to the anti-corrosive, it is possible to use, for example, tolyltriazole, benzotriazole and its derivatives, fatty acid phosphorus derivatives such as octyl phosphate and dioctyl thiophosphate, imidazole, benzoimidazole and its derivatives, benzoimidazole, 2-mercaptobenzothiazole, octyloxymethane phosphonic acid, dicyclohexylammonium nitrite, diisopropylammonium nitrite, propargyl alcohol, dialkylthiourea, etc.

Each of these may be used alone, or two or more may be used in combination.

(pH-controlling Agent)

As to the pH-controlling agent, it is possible to use, for example, sodium hydroxide, potassium hydroxide, potassium phosphate, calcium hydroxide, sodium carbonate, sodium hydrogen carbonate, ammonia, methylamine, dimethylamine, trimethylamine, ethylamine, diethylamine, triethylamine, propylamine, dipropylamine, tripropylamine, butylamine, dibutylamine, tributylamine, isobutylamine, diisobutylamine, 2-butaneamine, N-(1-methylpropyl)-1-propaneamine, N,N-dimethylbutylamine, 1,2-dimethylpropylamine, N-ethyl-1,2-dimethylpropylamine, allylamine, diallylamine, triallylamine, N,N-dimethylallylamine, N-methyldiallylamine, 3-pentylamine, N,N-diisopropylethylamine, 2-(hydroxymethylamino)ethanol, 2-aminopropanol, 3-aminopropanol, triethanolamine, monoethanolamine, diethanolamine, 2-amino-2-methyl-1-propanol, N-isobutyldiethanolamine, 3-methoxypropylamine, 3-propyloxypropylamine, 3-isopropyloxypropylamine, 3-butoxypropylamine, etc.

Each of these may be used alone, or two or more may be used in combination.

(Anti-Drying Agent)

As to the anti-draying agent, it is possible to use, for example, urea, thiourea, ethylene urea, reduced starch resolvents, reduced dextrin, reduced maltodextrin, etc.

Each of these may be used alone, or two or more may be used in combination.

(Thickener)

As to the thickener, it is possible to use, for example, gum Arabic, gum tragacanth, Locust bean gum, Cyamoposis gum and its derivatives, alginic acid, alginate, pectin, carageenan, gelatin, casein, casein sodium, xanthan gum, rhamsan gum, welan gum, gelan gum, dextran, methyl cellulose, ethyl cellulose, hydroxyethyl cellulose, carboxymethyl cellulose, hydroxypropyl cellulose, sodium carboxymethyl starch, lanolin derivatives, chitosan derivatives, lactalbumin, polyethylene oxide, polyethylene glycol, polyvinyl alcohol, polyvinylmethylether, polyvinylpyrrolidone and its derivatives, polyacrylate resin, crosslinked polyacrylic resin, polyurethane resin, alkali metal salts of acrylic resin, etc.

Each of these may be used alone, or two or more may be used in combination.

(Emulsion)

As to the emulsion, it is possible to use, for example, polystyrene, polymethyl methacrylate, polyvinylchloride, polyvinylacetate, benzoguanamine resin, epoxy resin, copolymer compound of such as α,β-ethylenic unsaturated acids (e.g. acrylic acid, methacrylic acid, maleic acid, etc.), acrylic acid esters and methacrylic acid esters (e.g. ethyl acrylate, propyl acrylate, butyl acrylate, methyl methacrylate, ethylmethacrylate, propylmethacrylate, butyl methacrylate, etc.), and vinyl aromatic compounds (e.g. styrene and vinyl toluene), etc.

Each of these may be used alone, or two or more may be used in combination.

(Colorant 60)

The above-described colorant 60 corresponds to dye or pigment of the conventional ink, and is mainly composed of the conventional ink other than vehicle matter.

For example, the colorant 60 in solid form or in liquid form of high concentration can be prepared by using the dye or pigment of the conventional ink as it is.

Moreover, the colorant 60 in liquid form of high concentration can be prepared by dissolving or dispersing an extremely large amount of dye or pigment in the vehicle matter of the conventional ink.

Specifically, it is possible to prepare the colorant 60 by using, for example, dye such as direct dye, acid dye, basic dye, fluorescent dye or food color, or pigment such as inorganic pigment, organic pigment, inorganic fluorescent pigment or organic fluorescent pigment, as it is.

Further detailed description with respect to direct dye, acid dye, basic dye, fluorescent dye, food color, inorganic pigment, organic pigment, inorganic fluorescent pigment, organic fluorescent pigment, nonionic surfactant, anionic surfactant, and water-soluble polymers used for preparing the colorant 60 is given below.

(Direct Dye)

As to the direct dye, it is possible to use, for example, C.I. Direct Black 17, 19, 22, 32, 38, 51 and 71, C.I. Direct Yellow 4, 26, 44 and 50, C.I. Direct Red 1, 4, 23, 28, 31, 37, 39, 75, 80, 81, 83, 225, 226 and 227 and C.I. Direct Blue 1, 15, 71, 86, 106 and 119, etc.

Each of these may be used alone, or two or more may be used in combination.

(Acid Dye)

As to the acid dye, it is possible to use, for example, C.I. Acid Black 1, 2, 24, 26, 31, 52, 107, 109, 110, 119 and 154, C.I. Solvent Black 5, C.I. Acid Yellow 7, 17, 19, 23, 25, 29, 38, 42, 49, 61, 72, 78, 110, 141, 127, 135 and 142, C.I. Acid Red 8, 9, 14, 18, 26, 27, 35, 37, 51, 52, 57, 82, 87, 92, 94, 111, 129, 131, 138, 186, 249, 254, 265 and 276, C.I. Acid Violet 15 and 17, C.I. Acid Blue 1, 7, 9, 15, 22, 23, 25, 40, 41, 43, 62, 78, 83, 90, 93, 103, 112, 113 and 158, C.I. Acid Green 3, 9, 16, 25 and 27, etc.

Each of these may be used alone, or two or more may be used in combination.

(Basic Dye)

As to the basic dye, it is possible to use, for example, C.I. Basic Yellow 1, 2 and 21, C.I. Basic Orange 2, 14 and 32, C.I. Basic Red 1, 2, 9 and 14, C.I. Basic Violet 1, 3 and 7, C.I. Basic Brown 12, C.I. Basic Black 2 and 8, C.I. Solvent Violet 8, C.I. Basic Green 4, C.I. Solvent Blue 2, C.I. Solvent Red 49, C.I. Basic Blue 9, etc.

Each of these may be used alone, or two or more may be used in combination.

(Fluorescent dye)

As to the fluorescent dye, it is possible to use, for example, C.I. Acid Yellow 7, C.I. Basic Red 1, etc.

Each of these may be used alone, or two or more may be used in combination.

(Food Color)

Most kinds of the food color are included in direct dye or acid dye. As to the food color not included therein, it is possible to use, for example, C.I. Food Yellow 3.

(Inorganic Pigment)

As to the inorganic pigment, it is possible to use, for example, titanium oxide, carbon black, red oxide, chromium oxide, iron black, cobalt blue, alumina white, iron oxide yellow, viridian, zinc sulfide, lithopone, cadmium yellow, vermilion, cadmium red, chrome yellow, molybdate orange, zinc chromate, strontium chromate, white carbon, clay, talc, ultramarine blue, precipitated barium carbonate, baryte powder, calcium carbonate, white lead, Prussian blue, manganese violet, aluminum powder, stainless powder, nickel powder, copper powder, zinc powder, brass powder, etc.

Each of these may be used alone, or two or more may be used in combination.

(Organic Pigment)

As to the organic pigments, it is possible to use, for example, azo lake, insoluble azo pigment, chelate azo pigment, phthalocyanine pigment, perylene and perinone pigment, anthraquinone pigment, quinacridone pigment, dye lake, nitro pigment, nitroso dyes, etc., and more specifically, phthalocyanine blue (C.I. 74160), phthalocyanine green (C.I. 74260), Hanza yellow 3G (C.I. 11670), disazo yellow GR (C.I. 21100), permanent red 4R (C.I. 12335), brilliant carmine 6B (C.I. 15850), quinacridone red (C.I. 46500), etc.

Each of these may be used alone, or two or more may be used in combination.

(Inorganic Fluorescent Pigment)

As to the inorganic fluorescent pigment, it is possible to use, for example, heavy metal salt such as zinc sulfide or alkali earth metal sulfide of high purity, which is added with a trace amount of activator such as copper, silver or manganese and calcinated at a high temperature.

(Organic Fluorescent Pigment)

As to the organic fluorescent pigment, possible to use, for example, solid solution in which fluorescent dye is dissolved in synthetic resin vehicle. The fluorescent dye herein refers to C.I. Acid Yellow 7, C.I. Basic Red-1, etc., and the synthetic resin herein refers to vinyl chloride resin, alkyd resin, alkali resin, etc.

(Nonionic Surfactant)

As to the nonionic surfactant, it is possible to use, for example, polyoxyalkylene higher fatty acid esters, higher fatty acid partial esters of polyhydroxy alcohol, higher fatty acid esters of sugar, etc., and more specifically, fatty acid esters of glycerin, polyglycerin fatty acid esters, propylene glycol fatty acid esters, pentaerythritol fatty acid esters polyoxyethylene sorbitan fatty acid esters, polyoxylethylene sorbit fatty acid esters, polyoxyethylene glycerin fatty acid esters, polyethylene glycol fatty acid esters, polyoxylthylene alkyl ethers, polyoxyethylene psytosterol, polyoxyethylene polyoxypropylene alkyl ethers, polyoxyethylene alkyl phenyl ethers, polyoxyethylene castor oil, polyoxyethylene lanolin, polyoxyethylene lanolin alcohols, polyoxyethylene alkylamine, polyoxyethylene fatty acid amides, polyoxyethylene alkyl phenyl formaldehyde condensates, etc.

Each of these may be used alone, or two or more may be used in combination.

(Anionic Surfactant)

As to the anionic surfactant, it is possible to use, for example, alkylated sulfonates of higher fatty acid amide, alkylallylsulfonate, etc., and more specifically, alkyl sulfates, polyixyethylene alkylether sulfates, N-acyl amino acid salts, N-acyl methyl tauline salts, polyoxyethylene alkylether acetates, alkylphosphates, polyoxyethylene alkylether phosphates, etc.

Each of these may be used alone, or two or more may be used in combination.

(Water-soluble Polymer)

As to the water-soluble polymer, it is possible to use resin such as polyacrylic acid, acrylic acid copolymers, maleic acid resin, etc., and more specifically, acrylic resin, styrene-acrylic acid resin, styrene-maleic acid resin, etc., which is prepared in salt form to obtain water solubility.

Each of these may be used alone, or two or more may be used in combination.

(Shaft Member)

The transparent shaft member is often made of polypropylene (PP) as its material. However, it may not always be made of polypropylene. It may be made of such material as: e.g., vinyls such as polyvinyl chloride (PVC), polyvinyl butyral (PVB), polyvinyl alcohol (PVA), polyvinylidene chloride (PVDC), polyvinyl acetate (PVAC), polyvinyl formal (PVF), or polyvinyl dichloride; polystyrenes such as polystyrene (PS), styrene-acrylonitrile copolymer (AS), or ABS; polyethylenes such as ethylene-vinyl acetate copolymer (EVA); acrylics such as polymethyl methacrylate (PMMA) or modified acrylic; fluorine plastics such as polychlorotrifluoroethylene (PCTFE), polytetrafluoroethylene (PTFE), polytetrafluoroethylene-polyhexafluoropropylene copolymer (FEP), or polyvinylidene fluoride (PVDF); or others such as polyacetal (PA), polycarbonate (PC), phenoxy, polyester (PETP), polyurethane (PU), phenol-formaldehyde resin (PF), urea-formaldehyde resin (UF), melamine-formaldehyde resin (MF), epoxy resin (EP), furan resin (FF), xylene resin (XF), silicone resin, or nylon.

The present invention is further described in detail with reference to examples and comparative examples below.

In each of the writing implements of Examples 4 and 5 and Comparative Examples 4 and 5, the liquid for ink and colorant could be stored separately.

Further, each of the writing implements of Examples 4 and 5 and Comparative Examples 4 and 5 could write in ink show a predetermined color (red or yellow) at its pen tip member.

INDUSTRIAL APPLICABILITY

The present invention is applicable to the field of manufacturing writing implements using ink. The writing implement stores therein liquid for ink and colorant separately, both of which are to be included in the ink, whereby the colorant is added to the liquid for ink in process of introducing the liquid for ink to a tip member of the pen to be colored ink, thereby allowing for writing in the colored ink.

The invention claimed is:

1. A writing implement in which liquid for ink and colorant are separately stored, comprising:
   a cylindrical shaft member;
   a pen tip member which is fixed to one end of the shaft member and from which colored ink seeps out;
   the liquid for ink which is stored in the shaft member and which comprises a major component of the colored ink seeping out from an end of the pen tip member;

the colorant to be added to the liquid for ink to be the colored ink, located between the tip member and the liquid for ink; and a valve member for isolating the colorant from the liquid for ink;

wherein at least a part of a cylindrical side surface of the shaft member corresponding to a part where the liquid for ink is stored is formed to be transparent;

wherein the valve member is positioned between the storing part of the liquid for ink and the colorant; and wherein the storing part of the liquid for ink is provided with a pressure-regulating part for preventing an increase or decrease of a pressure in the storing part.

2. The writing implement according to claim 1, wherein the valve member cooperates with the pen tip member such that the valve member is opened when writing and is closed when not writing.

3. The writing implement according claim 1, which has a valve-operating mechanism that can be operated to open and close the valve member.

4. The writing implement according to claim 1, which has colorant-adsorbing material in the storing part of liquid for ink in order to adsorb the colorant from the colored ink which has been added with the colorant and penetrates into the storing part.

5. The writing implement according to claim 1, which has a restriction member between the valve member and the storing part of the liquid for ink in order to prevent the colorant from moving toward the liquid for ink.

6. The writing implement according to claim 1, which has a restriction member between the valve member and the colorant in order to prevent colored ink added with the colorant from diffusing.

7. The writing implement according to claim 1, wherein insoluble substance whose specific gravity is approximately the same as that of the liquid for ink is dispersed in the storing part of the liquid for ink.

8. A writing implement in which the liquid for ink and two colorant are separately stored, comprising:

a cylindrical shaft member;

two pen tip members which are fixed to both ends of the shaft member and from which colored ink seeps out;

the liquid for ink which is stored in the shaft member and which comprises a major component of the colored ink seeping out from ends of the pen tip members;

two colorant to be added to the liquid for ink to be the colored ink; and two valve members for isolating respectively the two colorant from the liquid for ink;

wherein at least a part of a cylindrical side surface of the shaft member corresponding to the storing part of the liquid for ink is formed to be transparent;

wherein each of the two valve members is positioned between the storing part of the liquid for ink and each of the colorant; and wherein the storing part of the liquid for ink is provided with a pressure-regulating part for preventing the increase and decrease of the pressure in the storing part.

9. The writing implement according to claim 8, wherein each of the valve members cooperates with a corresponding pen tip member such that the valve member is opened when writing and is closed when not writing.

10. The writing implement according to claim 8, which has colorant-adsorbing material in the storing part of liquid for ink in order to adsorb the colorant from the colored ink which has been added with the colorant and penetrates into the storing part.

11. The writing implement according to claim 8, which has a restriction member between each of the valve members and the storing part of the liquid for ink in order to prevent the colorant from moving toward the liquid for ink.

12. The writing implement according to claim 8, which has a restriction member between each of the valve members and colorant in order to prevent colored ink added with the colorant from diffusing.

13. The writing implement according to claim 8, wherein insoluble substance whose specific gravity is approximately the same as that of the liquid for ink is dispersed in the storing part of the liquid for ink.

* * * * *

UNITED STATES PATENT AND TRADEMARK OFFICE
CERTIFICATE OF CORRECTION

| | | |
|---|---|---|
| PATENT NO. | : 7,070,352 B2 | Page 1 of 1 |
| APPLICATION NO. | : 10/488049 | |
| DATED | : July 4, 2006 | |
| INVENTOR(S) | : Hisashi Iida et al. | |

It is certified that error appears in the above-identified patent and that said Letters Patent is hereby corrected as shown below:

Cover page, item (30) Foreign Application Priority Data, "2001-2900002" should be --2001-290002--.

Signed and Sealed this

Fifth Day of December, 2006

JON W. DUDAS
*Director of the United States Patent and Trademark Office*